US012307748B2

United States Patent
Jia et al.

(10) Patent No.: US 12,307,748 B2
(45) Date of Patent: May 20, 2025

(54) CATEGORY DISCOVERY USING MACHINE LEARNING

(71) Applicant: Google LLC, Mountain View, CA (US)

(72) Inventors: Xuhui Jia, Seattle, WA (US); Kai Han, Bristol (GB)

(73) Assignee: Google LLC, Mountain View, CA (US)

( * ) Notice: Subject to any disclaimer, the term of this patent is extended or adjusted under 35 U.S.C. 154(b) by 418 days.

(21) Appl. No.: 17/729,878

(22) Filed: Apr. 26, 2022

(65) Prior Publication Data

US 2023/0343073 A1 Oct. 26, 2023

(51) Int. Cl.
G06V 10/82 (2022.01)
G06V 10/42 (2022.01)
G06V 10/44 (2022.01)
G06V 10/74 (2022.01)
G06V 10/764 (2022.01)
G06V 10/774 (2022.01)

(52) U.S. Cl.
CPC ............ G06V 10/774 (2022.01); G06V 10/42 (2022.01); G06V 10/44 (2022.01); G06V 10/761 (2022.01); G06V 10/764 (2022.01); G06V 10/82 (2022.01)

(58) Field of Classification Search
CPC .... G06V 10/774; G06V 10/761; G06V 10/42; G06V 10/82; G06V 10/44; G06V 10/764; G06N 3/084
See application file for complete search history.

(56) References Cited

U.S. PATENT DOCUMENTS

| 9,792,492 B2 * | 10/2017 | Soldevila | G06V 40/10 |
| 2020/0342328 A1 * | 10/2020 | Revaud | G06F 18/22 |
| 2021/0081804 A1 * | 3/2021 | Stojevic | G06N 3/088 |
| 2021/0398621 A1 * | 12/2021 | Stojevic | G16C 10/00 |
| 2022/0237445 A1 * | 7/2022 | Wang | G06N 3/08 |

OTHER PUBLICATIONS

Spyridon Stathopoulos et al.; "Medical Image Classification with Weighted Latent Semantic Tensors and Deep Convolutional Neural Networks"; Springer nature Switzerland. (Year: 2018).*

(Continued)

Primary Examiner — Shaghayegh Azima
(74) Attorney, Agent, or Firm — Fish & Richardson P.C.

(57) ABSTRACT

Methods, systems, and apparatus, including computer programs encoded on computer storage media, for performing novel category discovery. One of the methods includes generating first local feature tensors from a first training image; obtaining previous local feature tensors generated from a previous training image; generating a first similarity tensor representing a similarity between the first local feature tensors and the previous local feature tensors; obtaining a second similarity tensor for a second training image; processing, using a neural network, the first training image to generate a first training output representing a class prediction for the first training image; obtaining a second training output representing a class prediction for the second training image; and generating an update to the neural network from (i) a similarity between the first similarity tensor and the second similarity tensor and (ii) a similarity between the first training output and the second training output.

21 Claims, 7 Drawing Sheets

(56) References Cited

OTHER PUBLICATIONS

Ahn et al., "Variational Information Distillation for Knowledge Transfer," Proceedings of the IEEE/CVF Conference on Computer Vision and Pattern Recognition, Jun. 2019, pp. 9163-9171.
Arandjelovic et al., "NetVLAD: CNN Architecture for Weakly Supervised Place Recognition," Proceedings of the IEEE Conference on Computer Vision and Pattern Recognition, Jun. 2016, pp. 5297-5307.
Arthur et al., "K-Means++: The advantages of careful seeding," ACM-SIAM Symposium on Discrete Algorithms, 2007, 9 pages.
Bagherinezhad et al., "Label Refinery: Improving ImageNet Classification through Label Progression," arXiv, May 7, 2018, 16 pages.
Bay et al., "SURF: Speeded Up Robust Features," Presented at 9th European Conference on Computer Vision, Graz, Austria, May 7-13, 2006, pp. 404-417.
Berthelot et al., "MixMatch: A Holistic Approach to Semi-Supervised Learning," Advances in Neural Information Processing Systems, 2019, 11 pages.
Cao et al., "Unifying Deep Local and Global Features for Image Search," arXiv, Jan. 14, 2020, 13 pages.
Chen et al., "Improved Baselines with Momentum Contrastive Learning," arXiv, Mar. 9, 2020, 3 pages.
Comaniciu et al., "Mean shift: a robust approach toward feature space analysis," IEEE Transactions on Pattern Analysis and Machine Intelligence, May 2002, 24(5):603-619.
Deng et al., "Few-shot Learning by Exploiting Visual Concepts within CNNs," arXiv, Feb. 13, 2018, 7 pages.
Deng et al., "ImageNet: A large-scale hierarchical image database," Presented at 2009 IEEE Conference on Computer Vision and Pattern Recognition, Miami, FL, USA, Jun. 20-25, 2009, 8 pages.
Dizaji et al., "Deep Clustering via Joint Convolutional Autoencoder Embedding and Relative Entropy Minimization," Proceedings of the IEEE International Conference on Computer Vision, Oct. 2017, pp. 5736-5745.
Doersch et al., "CrossTransformers: spatially-aware few-shot transfer," Advances in Neural Information Processing Systems, 2020, 13 pages.
Fang et al., "SEED: Self-supervised Distillation For Visual Representation," Presented at The Ninth International Conference on Learning Representations, Virtual, May 3-7, 2021, 21 pages.
Furlanello et al., "Born Again Neural Networks," Proceedings of the 35th International Conference on Machine Learning, 2018, 10 pages.
Gidaris et al., "Unsupervised Representation Learning by Predicting Image Rotations," arXiv, Mar. 21, 2018, 16 pages.
Han et al., "Automatically Discovering and Learning New Visual Categories with Ranking Statistics," arXiv, Feb. 13, 2020, 13 pages.
Han et al., "Learning to Discover Novel Visual Categories via Deep Transfer Clustering," Proceedings of the IEEE/CVF International Conference on Computer Vision, Oct. 2019, pp. 8401-8409.
He et al., "Deep Residual Learning for Image Recognition," Proceedings of the IEEE Conference on Computer Vision and Pattern Recognition, Jun. 2016, pp. 770-778.
He et al., "Delving Deep into Rectifiers: Surpassing Human-Level Performance on ImageNet Classification," Proceedings of the IEEE International Conference on Computer Vision, Dec. 2015, pp. 1026-1034.
He et al., "Momentum contrast for unsupervised visual representation learning," Proceedings of the IEEE/CVF Conference on Computer Vision and Pattern Recognition, Jun. 2020, pp. 9729-9738.
Hinton et al., "Distilling the Knowledge in a Neural Network," arXiv, Mar. 9, 2015, 9 pages.
Hsu et al., "Learning to cluster in order to transfer across domains and tasks," arXiv, Mar. 17, 2018, 20 pages.
Hsu et al., "Multi-class classification without multi-class labels," arXiv, Jan. 2, 2019, 16 pages.
Huang et al., "Like What You Like: Knowledge Distill via Neuron Selectivity Transfer," arXiv, Dec. 18, 2017, 9 pages.
Kim et al., "Paraphrasing Complex Network: Network Compression via Factor Transfer," Advances in Neural Information Processing Systems, 2018, 10 pages.
Krause et al., "3D Object Representations for Fine-Grained Categorization," Presented at 2013 IEEE International Conference on Computer Vision Workshops, Sydney, NSW, Australia, Dec. 2-8, 2013, pp. 554-561.
Krizhevsky, "Learning multiple layers of features from tiny images," Technical Report, Apr. 8, 2009, 60 pages.
Kuhn, "The Hungarian method for the assignment problem," Naval Research Logistics Quarterly, Mar. 1955, pp. 83-97.
Laine et al., "Temporal ensembling for semi-supervised learning," arXiv, Mar. 15, 2017, 13 pages.
Lowe, "Distinctive Image Features from Scale-Invariant Keypoints," International Journal of Computer Vision, Nov. 2004, pp. 91-110.
MacQueen, "Some methods for classification and analysis of multivariate observations," Proceedings of the Fifth Berkeley Symposium on Mathematical Statistics and Probability, 1967, pp. 281-297.
Maji et al., "Fine-Grained Visual Classification of Aircraft," arXiv, Jun. 21, 2013, 6 pages.
Noh et al., "Large-Scale Image Retrieval With Attentive Deep Local Features," Proceedings of the IEEE International Conference on Computer Vision, Oct. 2017, pp. 3456-3465.
Oliver et al., "Realistic Evaluation of Deep Semi-Supervised Learning Algorithms," Advances in Neural Information Processing Systems, 2018, 12 pages.
Rebuffi et al., "LSD-C: Linearly Separable Deep Clusters," arXiv, Jun. 17, 2020, 13 pages.
Romero et al., "Fitnets: Hints for thin deep nets," Presented at 3rd International Conference on Learning Representations, ICLR 2015, San Diego, CA, USA, May 7-9, 2015, 13 pages.
Simeoni et al., "Local Features and Visual Words Emerge in Activations," Proceedings of the IEEE/CVF Conference on Computer Vision and Pattern Recognition, Jun. 2019, pp. 11651-11660.
Sohn et al., "FixMatch: Simplifying Semi-Supervised Learning with Consistency and Confidence," Advances in Neural Information Processing Systems, 2020, 13 pages.
Sutskever et al., "On the importance of initialization and momentum in deep learning," Proceedings of the 30th International Conference on Machine Learning, 2013, 9 pages.
Tahira et al., "InLoc: Indoor Visual Localization With Dense Matching and View Synthesis," Proceedings of the IEEE Conference on Computer Vision and Pattern Recognition, Jun. 2018, pp. 7199-7209.
Tarvainen et al., "Mean teachers are better role models: Weight-averaged consistency targets improve semi-supervised deep learning results," Advances in Neural Information Processing Systems, 2017, 10 pages.
Tian et al., "Contrastive Multiview Coding," arXiv, Dec. 18, 2020, 16 pages.
Tian et al., "Contrastive Representation Distillation," Presented at Eighth International Conference on Learning Representations, Virtual Conference, Apr. 26-May 1, 2020, 19 pages.
Wah et al., "CaltechUCSD Birds 200," Computation & Neural Systems Technical Report, 2010, 15 pages.
Xie et al., "Unsupervised Deep Embedding for Clustering Analysis," Proceedings of The 33rd International Conference on Machine Learning, 2016, 10 pages.
Yagnik et al., "The power of comparative reasoning," Presented at 2011 International Conference on Computer Vision, Barcelona, Spain, Nov. 6-13, 2011, 8 pages.
Yim et al., "A Gift From Knowledge Distillation: Fast Optimization, Network Minimization and Transfer Learning," Proceedings of the IEEE Conference on Computer Vision and Pattern Recognition, Jul. 2017, pp. 4133-4141.
Zagoruyko et al., "Paying More Attention to Attention: Improving the Performance of Convolutional Neural Networks via Attention Transfer," arXiv, Feb. 12, 2017, 13 pages.
Zhang et al., "Deep Mutual Learning," Proceedings of the IEEE Conference on Computer Vision and Pattern Recognition, Jun. 2018, pp. 4320-4328.

(56) References Cited

OTHER PUBLICATIONS

Zhang et al., "DeepEMD: Differentiable Earth Mover's Distance for Few-Shot Learning," arXiv, May 8, 2020, 14 pages.

* cited by examiner

CATEGORY DISCOVERY USING MACHINE LEARNING

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes systems implemented as computer programs on one or more computers in one or more locations that are configured to train a neural network to perform image classification, i.e., to process an image and to identify one or more image classes from a set of multiple image classes to which the image belongs. Before training the neural network, the set of image classes to which the neural network is to assign images is unknown. In other words, the image classes are not predetermined before training the neural network, but rather the image classes are determined concurrently with the training of the neural network.

In this specification, the process of determining a set of image classes given a set of images is called "novel category discovery." That is, in novel category discovery, a system processes a set of images that does not include class labels for the images and determines a set of novel image classes such that each image class includes one or more images from the set of images. As described in this specification, novel category discovery can be performed by a training system while training a neural network to classify input images according to the set of novel classes determined by the novel category discovery. In other words, when performing novel category discovery on a set of image classes during training of a neural network, the composition of each class in the set of image classes is learned during training of the neural network.

Typically, the set of novel images classes determined during novel category discovery do not have semantic tags or labels, i.e., the system does not automatically generate human-interpretable descriptions for the novel image classes. In some implementations, after the system has executed the novel category discovery to generate the novel image classes, semantic tags (e.g., "dog" or "winter") can be assigned to each novel images class, e.g., after inspection of the images assigned the novel image class by a user.

This specification also describes systems implemented as computer programs on one or more computers in one or more locations that are configured to execute a neural network that is configured to perform image classification using novel image classes after being trained using novel category discovery.

The subject matter described in this specification can be implemented in particular embodiments so as to realize one or more of the following advantages.

Using techniques described in this specification, a system can automatically learn a set of novel image classes to which images can be assigned. For example, the system can thus process a data set of unlabeled images to determine clusters of the unlabeled images that provide new insight to the data set. In many contexts, there can be a very large number of possible image classes to which a set of images can be assigned, making manual annotation impractical or impossible. Furthermore, such manual annotation can require specific domain expertise, e.g., if the images are medical images, which further renders large-scale manual annotation impractical or impossible. Using techniques described in this specification, a system can classify unlabeled data automatically.

Furthermore, using techniques described in this specification, a system can train a neural network to achieve high performance on image classification without any labeled data set, e.g., for either known or novel image classes. Obtaining labeled data sets can be expensive and time consuming, and so executing unsupervised or self-supervised learning as described herein can significantly improve the time and computational efficiency of the system.

In some implementations described in this specification, a neural network configured to perform image classification includes (i) a "global" subnetwork configured to extract global information about the images and (ii) a "local" subnetwork configured to extract local information about the images. In this specification, global information (or global features) of an image relates to the entire image, while local information (or local features) of an image relates to a particular spatial region of the image that is smaller than the entire image.

The global and local subnetworks can extract different types of information that are both useful for image classification, allowing the neural network to achieve better performance than if the neural network only include one of the subnetworks. For example, in some implementations, using only global features can cause the neural network to enjoy high recall but low precision, as the global features do not include finer local details of the images, leading to more false positives. As another example, in some implementations, using only local features can cause the neural network to enjoy high precision but low recall, as the local features more strictly focus on the finer local details, leading to more false negatives. By training with both subnetworks together (e.g., using mutual knowledge distillation as described below), the neural network can enjoy the benefits of both levels of granularity when classifying images.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that is configured to perform novel category discovery.

Figure 1:
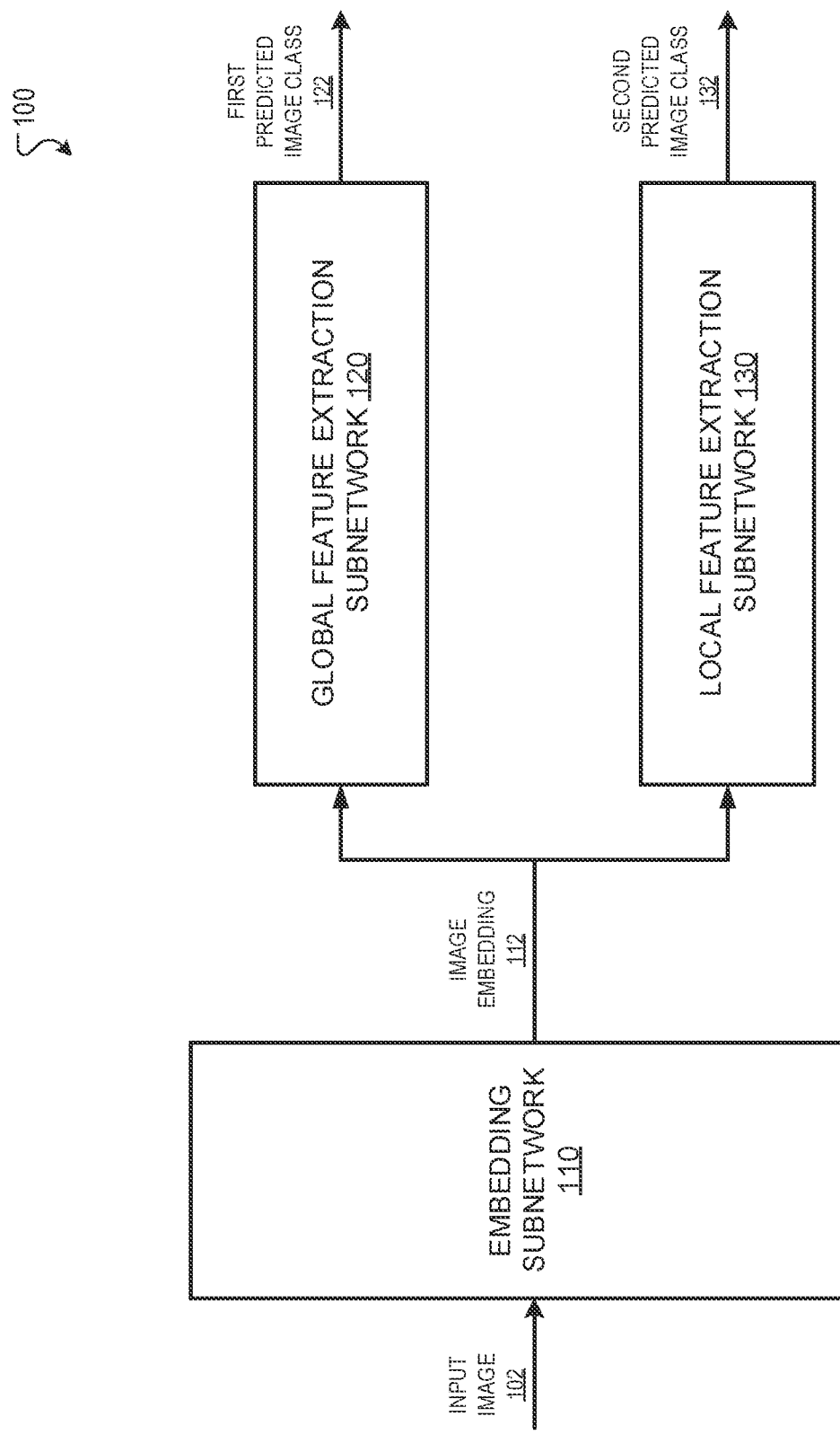
FIG. 1 is a diagram of an example neural network system configured to perform image classification.

FIG. 1 is a diagram of an example neural network system 100 configured to perform image classification. The neural network system 100 is an example of a system implemented as computer programs on one or more computers in one or more locations, in which the systems, components, and techniques described below can be implemented.

The neural network system 100 has been configured through training to process an input image 102 and to classify the image 102, i.e., to determine one or more image classes from a set of image classes to which the input image 102 belongs. In this specification, processing an image refers to processing the intensity values of the pixels of the image.

Before the training of the neural network system 100 by a training system, the set of image classes was unknown; that is, the training system performed novel category discovery during the training of the neural network system 100. In this specification, "novel" image classes are image classes that were unknown before training of a neural network to classify images according to the novel image classes; i.e., novel image classes are those image classes determined during novel category discovery. In this specification, "known" image classes are image classes that were known before training of a neural network to classify image according to the known image classes, e.g., where the neural network was trained using a set of image that each have a label identifying one or more of the known image classes.

Thus, the neural network system 100 is configured to classify images according to novel image classes. For example, one or more of the novel image classes can each identify a respective semantic object that is depicted in an image, e.g., "dog" or "city." As another example, one or more of the novel image classes can each identify a semantic state of an environment depicted in an image, e.g., "daytime" or "winter."

The number of novel classes can be predetermined before training the neural network, even though the novel classes themselves are unknown. For example, before performing novel category discovery using a set of unlabeled images, a system can estimate the number of novel classes represented in the set of unlabeled images. As a particular example, the system can perform a clustering technique on the set of unlabeled images and estimate that the number of novel classes is the same as the number of clusters.

The neural network system 100 can be configured to process input images 102 of any appropriate type. For example, the input image 102 can be a two-dimensional image, e.g., a two-dimensional image that has multiple channels (e.g., an RGB image). As another example, the input image 102 can be a hyperspectral image that represents a continuous spectrum of wavelengths, e.g., by identifying, for each pixel in the input image 102, a distribution over the spectrum. As another example, the input image 102 can be a point cloud that includes multiple points, where each point has a respective coordinate, e.g., in a three-dimensional or a higher-dimensional coordinate space; as a particular example, the input image 102 can be a point cloud generated by a LIDAR sensor. As another example, the input image 102 can be a medical image generating by a medical imaging device; as particular examples, the input image 102 can be a computer tomography (CT) image, a magnetic resonance imaging (MRI) image, an ultrasound image, an X-ray image, a mammogram image, a fluoroscopy image, or a positron-emission tomography (PET) image.

The neural network system 100 includes an embedding subnetwork 110, a global feature extraction subnetwork 120, and a local feature extraction subnetwork 130.

The embedding subnetwork 110 is configured to process the input image 102 and to generate an embedding 112 of the input image 102. In this specification, an embedding is an ordered collection of numeric values that represents an input in a particular embedding space. For example, an embedding can be a vector of floating point or other numeric values that has a fixed dimensionality.

The embedding subnetwork 110 can include one or more neural network layers of any appropriate type. For example, the embedding subnetwork 110 can include one or more convolutional neural network layers that are configured to apply convolutional kernels to the input image 102 (or to an intermediate representation of the input image 102). Instead or in addition, the embedding subnetwork 110 can include one or more self-attention neural network layers that are configured to apply a self-attention mechanism to a sequence determined from the input image 102 (or to a sequence determined from an intermediate representation of the input image 102), e.g., a sequence that includes elements each representing one or more respective pixels of the input image 102. Instead or in addition, the embedding subnetwork 110 can include one or more feedforward neural network layers and/or one or more recurrent neural network layers.

In some implementations, before the training of the neural network system 100, the embedding subnetwork 110 is pretrained with a second neural network that is configured to perform image classification using a set of labeled images that have been labeled using a predetermined set of known image classes, i.e., a set of image classes that is different from the set of novel image classes to which the neural network system 100 is configured to classify images. During the pretraining with the labeled images, the embedding subnetwork 110 can learn to extract meaningful information from images that is useful for classifying the images, even for classifying images into image classes that are different from those for which the embedding subnetwork 110 was pretrained.

The global feature extraction subnetwork 120 is configured to process the embedding 112 of the input image 102 and to determine a first predicted image class 122, from the set of novel image classes, to which the input image 102 is predicted to belong. The global feature extraction subnetwork 120 has been configured through training to extract global information about the input image 102 from the image embedding 112, i.e., to extract features that characterize the input image 102 as a whole and that do not relate only to respective portions of the input image 102.

For example, the global feature extraction subnetwork 120 can process the image embedding 112 using one or more neural network layers to generate a global embedding that encodes the global features of the input image 102. The global feature extraction subnetwork 120 can then process the global embedding to generate the first predicted image class 122, e.g., by generating a respective likelihood value for each novel image class in the set of novel image classes, and determining the first predicted image class 122 to be the novel image class with the highest likelihood value.

The global feature extraction subnetwork 120 can include neural network layers of any appropriate type, e.g., convolutional neural network layers, self-attention neural network layers, or feedforward neural network layers. Example global feature extraction subnetworks are described in more detail below with reference to FIG. 3A.

The local feature extraction subnetwork 130 is configured to process the embedding 112 of the input image 102 and to determine a second predicted image class 132, from the set of novel image classes, to which the input image 102 is predicted to belong. The local feature extraction subnetwork 130 has been configured through training to extract local information about the input image 102 from the image embedding 112, i.e., to extract features that characterize respective portions of the input image 102 as opposed to the input image 102 as a whole. For instance, the local feature extraction subnetwork 130 can be configured to determine features of respective spatial portions of the input image 102, e.g., respective sets of contiguous pixels of the input image 102.

For example, the local feature extraction subnetwork 130 can process the image embedding 112 using one or more neural network layers to generate a local embedding that encodes the local features of the input image 102. The local feature extraction subnetwork 130 can then process the local embedding to generate the second predicted image class 132, e.g., by generating a respective likelihood value for each novel image class in the set of novel image classes, and determining the second predicted image class 132 to be the novel image class with the highest likelihood value.

The local feature extraction subnetwork 130 can include neural network layers of any appropriate type, e.g., convolutional neural network layers, self-attention neural network layers, or feedforward neural network layers. Example local feature extraction subnetworks are described in more detail below with reference to FIG. 3B.

In some implementations, after generating the first predicted image class 122 and the second predicted image class 132, the neural network system 100 can combine the respective predictions 122 and 132 to generate a final prediction of one or more novel image classes to which the input image 102 belongs. For example, the neural network system 100 can identify which one of the predicted image classes 122 and 132 has higher corresponding likelihood value (i.e., if the global feature extraction subnetwork 120 generated a higher likelihood value for the first predicted image class 122, or if the local feature extraction subnetwork 120 generated a higher likelihood value for the second predicted image class 132). As another example, the neural network system 100 can determine to predict that the input image 102 belongs to both the first predicted image class 122 and the second predicted image class 132.

In some implementations, the neural network system 100 only includes one of the global feature extraction subnetwork 120 or the local feature extraction subnetwork 130. In some such implementations, the neural network system 100 has been trained using both the global feature extraction subnetwork 120 and the local feature extraction subnetwork 130, and after training one of the two feature extractions subnetworks 120 or 130 is removed from the neural network system 100 so that the remaining feature extraction subnetwork 120 or 130 generates the predicted image classes for input images at inference time. As a particular example, after training the neural network system 100, the local feature extraction subnetwork 130 can be removed so that the global feature extraction subnetwork 120 generates the predicted image classes 122 for input images 102 received at inference time. Example techniques for training the neural network system 100 are described in more detail below with reference to FIG. 2, FIG. 3A, FIG. 3B, and FIG. 4.

In some implementations, the neural network system 100 has been trained concurrently with a second neural network system configured to perform image classification using a second set of known image classes. For example, one or more neural network layers of the neural network system 100 can be shared with the second neural network system, e.g., the embedding subnetwork 110 can be shared between the two neural network systems. By performing supervised training on the second neural network system with the set of known image classes, the shared neural network layers (e.g., the embedding subnetwork 110) can learn to extract meaningful information from images, which can be useful when classifying images into the set of novel image classes. Techniques for concurrent training using known image classes and novel image classes are described in more detail below with reference to FIG. 2.

Figure 2:
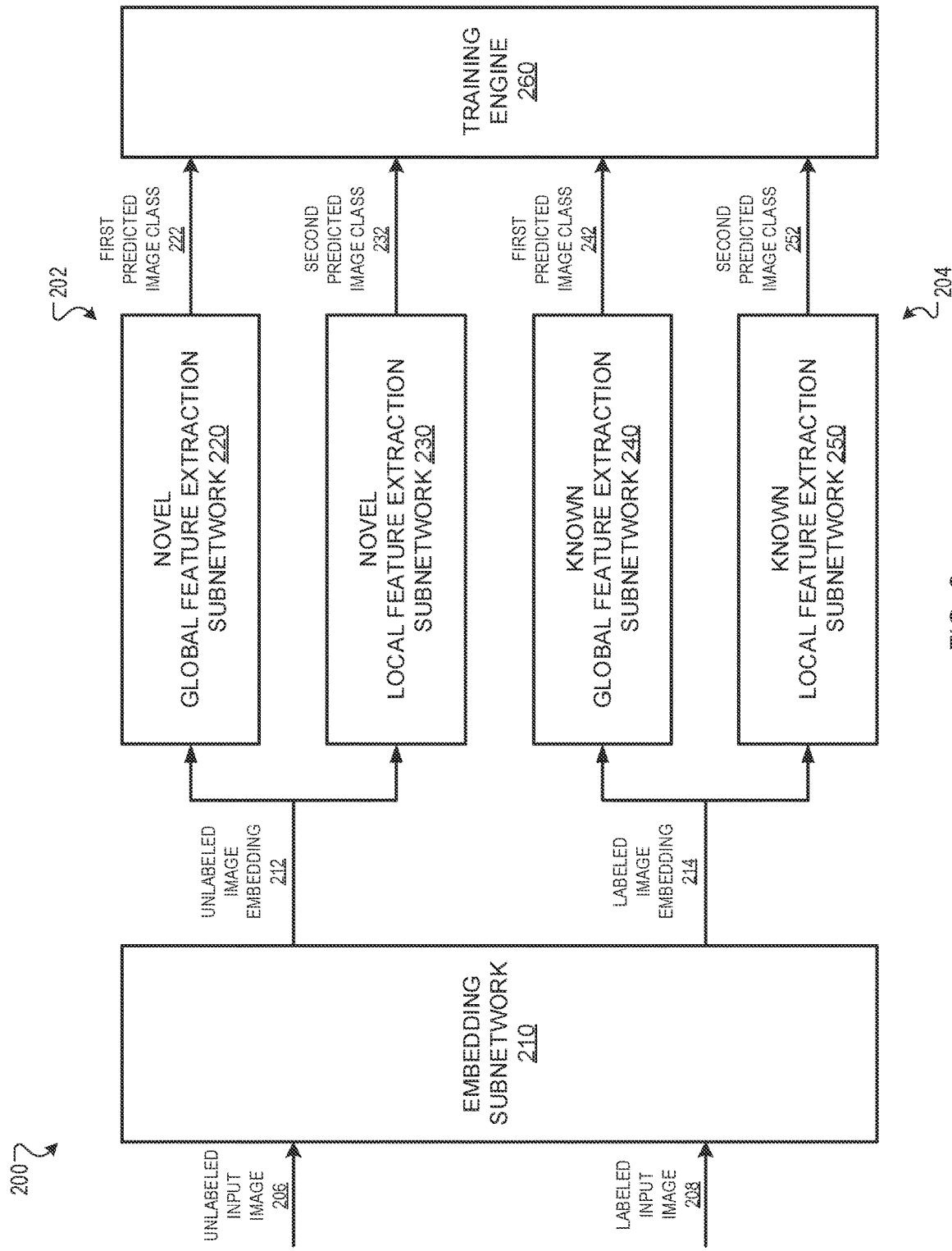
FIG. 2 is a diagram of an example training system configured to train a neural network system to perform image classification.

FIG. 2 is a diagram of an example training system 200 configured to train a neural network system to perform image classification. The training system 200 is an example of a system implemented as computer programs on one or more computers in one or more locations, in which the systems, components, and techniques described below can be implemented.

The training system 200 is configured to concurrently two neural networks: (i) a first neural network 202 configured to classify images into a set of novel image classes determined during the training of the first neural network 202, and (ii) a second neural network 204 configured to classify images into a set of known image classes predetermined before the training of the second neural network 204. The first neural network 202 includes an embedding subnetwork 210, a novel global feature extraction subnetwork 220, and a novel local feature extraction subnetwork 230. The second neural network 204 includes the embedding subnetwork 210, a known global feature extraction subnetwork 240, and a known local feature extraction subnetwork 250. That is, the first neural network 202 and the second neural network 204 share the embedding subnetwork 210.

The training system 200 further includes a training engine 260 that is configured to determine updates to (i) a set of first network parameters of the first neural network 202 and (ii) a set of second network parameters of the second neural network 204. The network parameters of the neural network layers that are shared between the first neural network 202 and the second neural network 204 (i.e., the set of network parameters of the embedding subnetwork 210) can be included in both the set of first network parameters and the set of second network parameters.

To train the first neural network 202, the training system 200 processes an unlabeled input image 206 to classify the unlabeled input image 206 into one or more novel image classes from the set of novel image classes.

In particular, the training system 200 processes the unlabeled input image 206 using the embedding subnetwork 210 to generate an embedding 212 of the unlabeled input image 206. The embedding subnetwork 210 can include neural network layers of any appropriate type. For example, the embedding subnetwork 210 can be configured similarly to the embedding subnetwork 110 described above with reference to FIG. 1.

The training system 200 can process the embedding 212 of the unlabeled input image 206 using the novel global feature extraction subnetwork 220 to generate a first predicted image class 222, from the set of novel image classes, for the unlabeled input image 206. The novel global feature extraction subnetwork 220 can be configured to extract global information about the unlabeled input image 206 from the embedding 212 in order to generate the first predicted image class 222. For example, the novel global feature extraction subnetwork 220 can be configured similarly to the global feature extraction subnetwork 120 described above with reference to FIG. 1.

The training engine 260 can obtain the first predicted image class 222 generated by the novel global feature extraction subnetwork 220 and use the first predicted image class 222 to determine an update to some or all of the first network parameters of the first neural network 202, e.g., to determine an update to the network parameters of the novel global feature extraction subnetwork 220 and the embedding subnetwork 210. In particular, because the input image 206 is unlabeled and the set of novel image classes are unknown before the execution of the training system 200, the training engine 260 can determine the parameter update by processing the first predicted image class 222 according to one or more unsupervised learning techniques. For example, the training engine 260 can execute a ranked statistics technique to determine the update; using ranked statistics to update the network parameters of a global feature extraction subnetwork is described in more detail below with reference to FIG. 3A.

The training system 200 can process the embedding 212 of the unlabeled input image 206 using the novel local feature extraction subnetwork 230 to generate a second predicted image class 232, from the set of novel image classes, for the unlabeled input image 206. The novel local feature extraction subnetwork 230 can be configured to extract local information about respective portions (e.g., spatially local regions) of the unlabeled input image 206 from the embedding 212 in order to generate the second predicted image class 232. For example, the novel local feature extraction subnetwork 230 can be configured similarly to the local feature extraction subnetwork 130 described above with reference to FIG. 1.

The training engine 260 can obtain the second predicted image class 232 generated by the novel local feature extraction subnetwork 230 and use the second predicted image class 232 to determine an update to some or all of the first network parameters of the first neural network 202, e.g., to determine an update to the network parameters of the novel local feature extraction subnetwork 230 and the embedding subnetwork 210. In particular, because the input image 206 is unlabeled and the set of novel image classes are unknown before the execution of the training system 200, the training engine 260 can determine the parameter update by processing the second predicted image class 232 according to one or more unsupervised learning techniques. For example, the training engine 260 can execute a ranked statistics technique to determine the parameter update; using ranked statistics to update the network parameters of a local feature extraction subnetwork is described in more detail below with reference to FIG. 3B.

In some implementations, the training engine 260 can determine a difference between the first predicted image class 222 and the second predicted image class 232, and use the difference to determine an update to some or all of the first network parameters, e.g., to determine an update to the network parameters of both the novel global feature extraction subnetwork 220 and the novel local feature extraction subnetwork 230 (and, optionally, the embedding subnetwork 210). For example, the training engine 260 can execute a mutual knowledge distillation technique to cause or encourage the novel global feature extraction subnetwork 220 and the novel local feature extraction subnetwork 230 to generate the same predicted image class. Using mutual knowledge distillation to update the network parameters of a global feature extraction subnetwork and a local feature extraction subnetwork is described in more detail below with reference to FIG. 4.

In some implementations, the training engine 260 further determines the update to the set of first network parameters using a consistency loss metric that causes or encourages the predicted image classes generated by the first neural network 202 to be the same when processing the same input image 206 under different image transformations. That is, the consistency loss metric can cause or encourage the neural network 202 to generate the same predicted image classes 222 and 232 in response to processing (i) the unlabeled input image 206 and (ii) a transformed version of the unlabeled input image 206 generated by applying one or more image transformations to the unlabeled input image 206. As a particular example, given a set of unlabeled input images $x_i^u$ and a transformed versions of the unlabeled input images $\hat{x}_i^u$, the consistency loss metric can be equal or proportional to:

$$\mathcal{L}_{con} = \frac{1}{M} \sum_{i=1}^{M} \left[ \left( \theta_g^u(w_i^u) - \theta_g^u(\hat{w}_i^u) \right)^2 + \left( \theta_p^u(w_i^u) - \theta_p^u(\hat{w}_i^u) \right)^2 \right]$$

where $w_i^u$ is the embedding of the unlabeled input image $x_i^u$ generated by the embedding subnetwork 210, $\hat{w}_i^u$ is the embedding of the transformed version of the unlabeled input image $\hat{x}_i^u$ generated by the embedding subnetwork 210, $\theta_g^u$ represents the operations of the novel global feature extraction subnetwork 220, $\theta_p^u$ represents the operations of the novel local feature extraction subnetwork 230, and M is the number of unlabeled input images $x_i^u$ in the training set. The training engine 260 can determine the parameter update from the consistency loss value based upon stochastic gradient descent or any other appropriate technique for training neural networks.

To train the second neural network 204, the training system 200 processes a labeled input image 208 to classify the labeled input image 208 into one or more known image classes from the set of known image classes. In particular, the training system 200 processes the labeled input image 208 using the embedding subnetwork 210 to generate an embedding 214 of the labeled input image 208.

The training system 200 can process the embedding 214 of the labeled input image 208 using the known global feature extraction subnetwork 240 to determine a first predicted image class 242, from the set of known image classes, for the labeled input image 208. The known global feature extraction subnetwork 240 can include neural network layers of any appropriate type, e.g., one or more of convolutional neural network layers, self-attention neural network layers, or feedforward neural networks layers.

The training system 200 can process the embedding 214 of the labeled input image 208 using the known local feature extraction subnetwork 250 to determine a second predicted image class 252, from the set of known image classes, for the labeled input image 208. The known local feature extraction subnetwork 250 can include neural network layers of any appropriate type, e.g., one or more of convolutional neural network layers, self-attention neural network layers, or feedforward neural networks layers.

The training engine 260 can obtain the first predicted image class 242 generated by the known global feature extraction subnetwork 240 and the second predicted image class 252 generated by the local global feature extraction subnetwork 250, and use the predicted image classes 242 and 252 to determine an update to some or all of the second network parameters of the second neural network 204. In particular, because the input image 208 is labeled, the training engine 260 can determine the parameter update by processing the first predicted image class 242 and the second predicted image class 252 according to one or more supervised learning techniques. For example, the training engine 260 can determine a cross-entropy loss, e.g., by computing, given a training set of labeled input images $x_i^l$ and corresponding labels $y_i$:

$$\mathcal{L}_{CE} = -\frac{1}{N}\sum_{i=1}^{N} y_i \log \theta_g^l(w_i^l) + y_i \log \theta_p^l(w_i^l)$$

where $w_i^l$ is the embedding of the labeled input image $x_i^l$ generated by the embedding subnetwork 210, $\theta_g^l$ represents the operations of the known global feature extraction subnetwork 240, $\theta_p^l$ represents the operations of the known local feature extraction subnetwork 250, and N is the number of labeled input images $x_i^l$ in the training set. The training engine 260 can determine the parameter update from the cross-entropy loss value based upon stochastic gradient descent or any other appropriate technique for training neural networks.

In some implementations, the novel global feature extraction subnetwork 220 and the known global feature extraction subnetwork 240 share one or more neural network layers. Because both global feature extraction subnetworks 220 and 240 are configured to extract global information from the respective image embeddings 212 and 214, the shared neural network layers can be trained, using the respective parameter updates for both the first neural network 202 and the second neural network 204, to extract the same useful information from the embeddings 212 and 214. For example, the k first neural network layers of the novel global feature extraction subnetwork 220 and the known global feature extraction subnetwork 240 can be shared, k≥1. The operations of the shared neural network layers of the novel global feature extraction subnetwork 220 and the known global feature extraction subnetwork 240 can be represented by $\psi_g$.

Similarly, in some implementations, the novel local feature extraction subnetwork 230 and the known local feature extraction subnetwork 250 share one or more neural network layers. Because both local feature extraction subnetworks 230 and 250 are configured to extract local information from local regions of the respective image embeddings 212 and 214, the shared neural network layers can be trained, using the respective parameter updates for both the first neural network 202 and the second neural network 204, to extract the same useful information from the embeddings 212 and 214. For example, the k first neural network layers of the novel local feature extraction subnetwork 230 and the known local feature extraction subnetwork 250 can be shared, k≥1. The operations of the shared neural network layers of the novel local feature extraction subnetwork 230 and the known local feature extraction subnetwork 250 can be represented by $\psi_p$.

In some implementations, the network parameters of the embedding subnetwork 210 have been pretrained and are frozen during the execution of the training system 200. That is, the training engine 260 can generate parameter updates for each of the feature extraction subnetworks 220, 230, 240, and 250, while keeping the network parameters of the embedding subnetwork 210 constant.

The training system 200 can repeat the process described above using multiple different unlabeled input images 206 and/or multiple different labeled input image 208 until the neural networks 202 and 204 are trained, e.g., until a performance of the neural networks 202 and 204 330 (e.g., as measured by prediction accuracy) reaches a predetermined threshold, until a marginal improvement to the performance of the neural networks 202 and 204 falls below a predetermined threshold, until a threshold number of training iterations have been performed, or until a threshold amount of time has elapsed.

After training, the first neural network 202 can be deployed in an inference environment, e.g., to classify new images drawn from the same or a similar distribution as the unlabeled input image 206. For instance, after training, the first neural network 202 can be deployed on a user device, e.g., a mobile device such as a mobile phone or tablet, and/or on the cloud. As a particular example, the first neural network 202 can be deployed in the neural network system 100 described above with reference to FIG. 1.

The first neural network 202 can be deployed with or without the second neural network 204. That is, in some implementations, after training is complete the second neural network 204 can be removed and only the first neural network deployed to classify images according to the novel image classes determined during the training.

As described above with reference to FIG. 1, in some implementations, after training of the first neural network 202, one of the novel global feature extraction subnetwork 220 or the novel local feature extraction subnetwork 230 is removed from the first neural network 202, so that at inference time only the remaining feature extraction subnetwork 220 or 230 generates the predicted image classes for input images.

In some other implementations, the first neural network 202 does not include one of the novel global feature extraction subnetwork 220 or the novel local feature extraction neural network 230 even during training. Similarly, in some implementations, the second neural network 204 does not include one of the known global feature extraction subnetwork 240 or the known local feature extraction subnetwork 250.

Figure 3A:
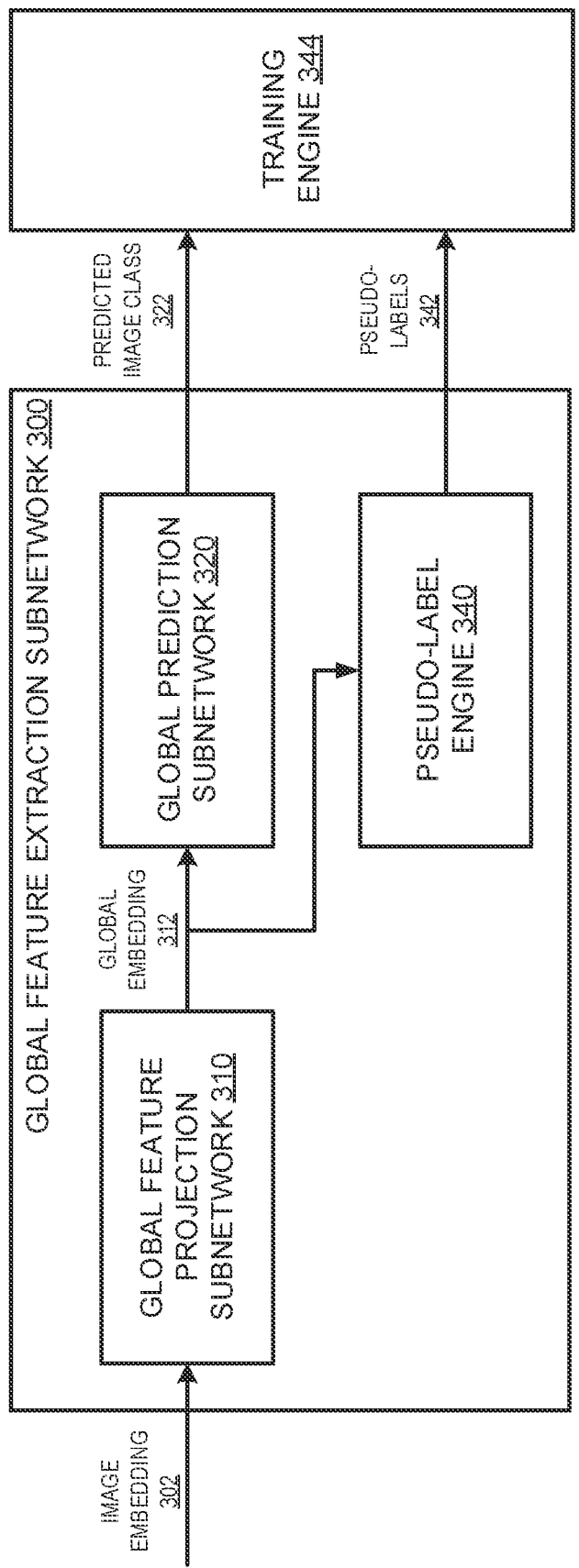
FIG. 3A is a diagram of an example global feature extraction subnetwork.

FIG. 3A is a diagram of an example global feature extraction subnetwork 300.

The global feature extraction subnetwork 300 can be a component of a neural network system that is configured to process an input image and to generate a prediction of a novel image class, from a set of novel image classes, to which the input image belongs. Although the below description refers to implementations in which the neural network system classifies input images into novel image classes, it is to be understood that the techniques described below can be used to train a neural network to classify input images into known image classes. For example, the input image can be obtained from a labeled image set, and the techniques described below can be executed to provide an auxiliary loss in addition to the supervised loss determined from the labels in the labeled image set.

For example, the global feature extraction subnetwork 300 can be the global feature extraction subnetwork 120 of the neural network system 100 described above with reference to FIG. 1, or the novel global feature extraction subnetwork 220 of the neural network 202 described above with reference to FIG. 2.

In particular, the global feature extraction subnetwork 300 is configured to process an embedding 302 of the input image and to generate a predicted image class 322 of the input image. In some implementations, the global feature extraction subnetwork 300 is configured to process the input image itself instead of an embedding 302 of the input image.

The global feature extraction subnetwork 300 includes a global feature projection subnetwork 310 and a global prediction subnetwork 320.

The global feature projection subnetwork 310 is configured to process the image embedding 302 and to generate a global embedding 312 that is an updated embedding of the input image. The global feature projection subnetwork 310 can have any appropriate network architecture. For example, if the image embedding 302 is represented as a one-dimensional tensor, then the global feature projection subnetwork 310 can include one or more feedforward neural network layers. As another example, if the image embedding 302 is represented as a two-dimensional or three-dimensional tensor, then the global feature projection subnetwork 310 can include one or more convolutional neural network layers. As another example, the global feature projection subnetwork 310 can be configured to generate a sequence of elements from the image embedding 302 (e.g., where each element in the sequence includes one or more elements of the tensor representing the image embedding 302), and process the sequence using one or more self-attention neural network layers. In some implementations, the final layer of the global feature projection subnetwork is an average pooling layer.

The operations of the global feature projection subnetwork 310 can be represented as $\psi_g^u$. Thus, given an embedding $w_i^u$ of an unlabeled input image $x_i^u$, the global feature projection subnetwork 310 can compute:

$$z_i^u = \psi_g^u(w_i^u)$$

where $z_i^u$ is the global embedding 312 of the unlabeled input image $x_i^u$.

In some implementations, the global feature projection subnetwork 310 is shared between the global feature extraction subnetwork 300 and a second global feature extraction subnetwork configured to classify images into a set of known image classes (e.g., the known global feature extraction subnetwork 240 described above with reference to FIG. 2). In these implementations, the operations of the global feature projection subnetwork 310 can be represented as $\psi_g$.

The global prediction subnetwork 320 is configured to process the global embedding 312 and to generate the predicted image class 322 for the input image. For example, the global prediction subnetwork 320 can generate an output tensor that identifies, for each novel class in the set of novel classes, a likelihood value that represents a likelihood that the input image belongs to the class. In some such implementations, the global prediction subnetwork 320 can select the novel image class with the highest likelihood value as the predicted image class 322. In some other such implementations, the global prediction subnetwork 320 can sample a novel image class from the set of novel image classes according to the respective likelihood values, and identify the sampled novel image class as the predicted image class 322.

In some implementations, the global prediction subnetwork 320 identifies multiple novel image classes as predicted image classes 322, e.g., by identifying each novel image class whose likelihood value exceeds a predetermined threshold.

In some implementations, e.g., during training of the neural network system, the predicted image class 322 can itself be represented by the output tensor of likelihood values; for example, comparing the predicted image class 322 with the pseudo-labels 342 as described below can include comparing the output tensor of likelihood values with the pseudo-labels 342.

The operations of the global prediction subnetwork 320 can be represented as $\eta_g^u$.

During training of the neural network system of which the global feature extraction subnetwork 300 is a component, a training engine 344 can process the predicted image class 322 to determine parameter updates to the set of network parameters of the global feature extraction subnetwork 300.

During training of the neural network system, the global feature extraction subnetwork 300 can include a pseudo-label engine 340. Typically, after the neural network system is trained and deployed in an inference environment, the global feature extraction subnetwork 300 does not include the pseudo-label engine 340.

The pseudo-label engine 340 is configured to process the global embedding 312 of the input image and to generate, for the input image, a set of pseudo-labels 342 that each correspond to a respective second input image that has also been processed by the neural network system during training. Each pseudo-label 342 corresponding to a particular second input image represents a similarity between the global embedding 312 of the input image and the global embedding 312 of the particular second input image. The input image can be called the "first" input image to differentiate from the second input images.

For example, the first input image and second input images can be in the same batch of images processed by the neural network system during a particular training step or epoch. Instead or in addition, the second input images can include images processed by the neural network system at respective previous training steps or epochs. In some implementations, the first input image and second input images have been drawn from an unlabeled training set of input images. In some other implementations, the first input image and/or one or more of the second input images have been drawn from a labeled training set of input images, but the labels are not used by the training engine 344 for the techniques described below.

In some implementations (e.g., in implementations in which the first input image and second input images are in the same training batch and processed concurrently by the neural network system), the pseudo-label engine 340 obtains the respective global embedding 312 for each second input image from the global feature projection subnetwork 310. In some other implementations (e.g., in implementations in which the second input images have been processed at respective previous training steps or epochs), the pseudo-label engine 340 includes a memory bank that stores the respective global embeddings 312 of the second input images previously processed by the neural network system. For example, the memory bank can store the respective global embeddings 312 of each second input image previously processed by the neural network system. As another example, the memory bank can store the respective global embeddings 312 of N second input images, e.g., as a first-in-first-out (FIFO) queue of size N.

The training engine 344 can determine parameter updates to cause or encourage the global feature extraction subnetwork 300 to generate similar predicted image classes 322 for pairs of input images whose pseudo-labels 342 indicate a high similarity between the respective global embeddings 312. In implementations in which the global feature extraction subnetwork 300 is trained concurrently with a known global feature extraction subnetwork (e.g., in implementations in which the global feature projection subnetwork 310 is shared with the known global feature extraction subnetwork), the global feature projection subnetwork 310 can be trained to generate global embeddings 312 that encode maximal information about the input images relevant for classifying the input images. Thus, if two input images have similar global embeddings 312, then the two input images are likely to belong to the same novel image class (or have similar predicted image classes 322, e.g., as represented by the output tensor of likelihood values generated by the global prediction subnetwork 320).

The pseudo-label engine 340 can generate the pseudo-labels 342 from the global embeddings 312 of the first input image and second input images using any appropriate comparison technique.

For example, the pseudo-label engine 340 can generate the pseudo-label 342 corresponding to a particular second input image using ranking statistics, i.e., by comparing the top-k elements (i.e., the k elements whose values have the largest magnitude) of the global embedding 312 of the first input image and the global embedding 312 of the particular second input image. If the same set of elements or a similar set of elements is in the top-k elements of both global embeddings 312, then the global embeddings 312 can be determined to be similar.

As a particular example, the pseudo-label engine 340 can determine the pseudo-label $s_{ij}^g$ between the global embedding $z_i^u$ of the first input image $x_i^u$ and the global embedding $z_j^u$ of a second input image $x_j^u$ to be:

$$s_{ij}^g = \mathbb{1}\{\text{top}_k(z_i^u) = \text{top}_k(z_j^u)\}$$

where $\mathbb{1}$ is the indicator function and $\text{top}_k(z_i^u)$ identifies the k elements of $z_i^u$ with the largest magnitude.

As another particular example, the pseudo-label engine 340 can determine the pseudo-label $s_{ij}^g$ between the global embedding $z_i^u$ of the first input image $x_i^u$ and the global embedding $z_j^u$ of a second input image $x_j^u$ to be:

$$s_{ij}^g = \frac{c}{k} \in [0, 1]$$

where c is the number of shared elements in $\text{top}_k(z_i^u)$ and $\text{top}_k(z_j^u)$.

As another example, the pseudo-label engine 340 can generate the pseudo-label 342 corresponding to a particular second input image by processing the global embedding 312 of the first input image and the global embedding 312 of the particular second input image using a similarity metric, e.g., cosine similarity, Euclidean distance, or dot product.

The training engine 344 can then compare the respective predicted image classes 322 (e.g., as represented by the output tensors of likelihood values across the set of novel image classes) of the first input image and the second input images to generate a parameter update that causes or encourages, for each particular second input image, the respective predicted image classes 322 of the first input image and the particular second input image to be similar if the corresponding pseudo-label 342 indicates a high similarity between the respective global embeddings 312.

In some implementations (e.g., in implementations in which the first input image and second input images are in the same training batch and processed concurrently by the neural network system), the training engine 344 obtains the respective predicted image classes 322 for each second input image from the global prediction subnetwork 320. In some other implementations, (e.g., in implementations in which the second input images have been processed at respective previous training steps or epochs), the training engine 344 includes a memory bank that stores the respective predicted image class 322 of second input images previously processed by the neural network system. For example, the memory bank can store the respective predicted image class 322 of each previously-processed second input image, or the respective predicted image class 222 of N second input images, e.g., as a FIFO queue of size N.

For example, the training engine 344 can determine a binary cross-entropy loss using the predicted image class 322 of the first input image, the predicted image classes 322 of the second input images, and the pseudo-labels 342. As a particular example, given a set of M unlabeled input images $x_i^u$, the training engine 344 can compute a loss that is equal to or proportional to:

$$\mathcal{L}_{BCE}^g = -\frac{1}{M^2}$$

$$\sum_{i=1}^{M}\sum_{j \neq i}[s_{ij}^g \log\left(\eta_g^u(z_i^u)^T\eta_g^u(z_j^u)\right) + (1 - s_{ij}^g)\log\left(1 - \eta_g^u(z_i^u)^T\eta_g^u(z_j^u)\right)]$$

Here, $\eta_g^u(z_i^u)^T\eta_g^u(z_j^u)$ represents a similarity between the predicted image class 322 of the first input image $x_i^u$ and the predicted image classes 322 of the second input image $x_j^u$. This similarity can also be referred to as $t_{ij}^g$.

The training engine 344 can then determine a parameter update for the network parameters of the global feature extraction subnetwork 300 (and, optionally, other components of the neural network system) using the computed loss value, e.g., based upon stochastic gradient descent or any other appropriate technique for training neural networks. For example, the training engine 344 can backpropagate the computed loss value through the global feature extraction subnetwork 300 and to one or more preceding neural network layers in the neural network system, e.g., to a preceding embedding subnetwork such as the embedding subnetwork 110 described above with reference to FIG. 1.

In some implementations, the pseudo-label engine 340 can determine pseudo-labels by comparing the image embeddings 302 of pairs of input images (instead of by comparing global embeddings 312 as described above). For example, in some implementations the global feature extraction subnetwork 300 does not include the global feature projection subnetwork 310, and the global prediction subnetwork 320 instead is configured to process the image embedding 302 directly. In these implementations, the training engine 342 can update the network parameters of the global feature extraction subnetwork 300 using the pseudo-labels generated from the image embeddings 302 as described above.

Figure 3B:
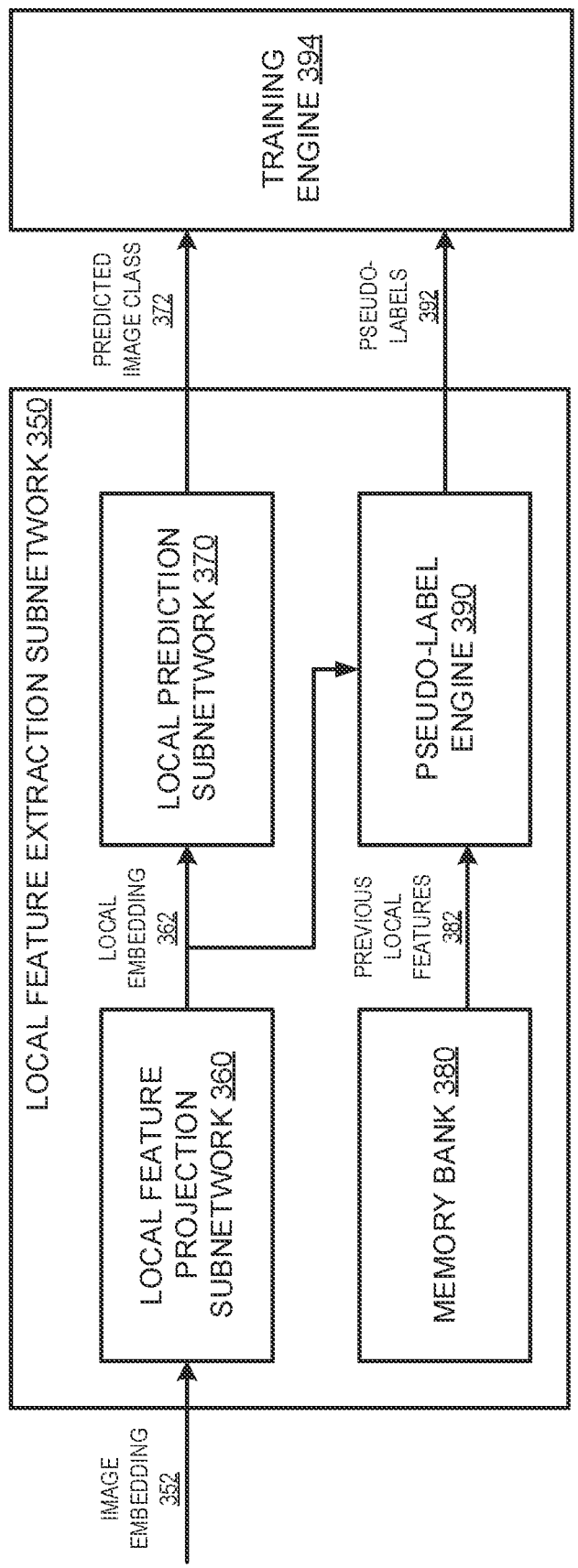
FIG. 3B is a diagram of an example local feature extraction network.

FIG. 3B is a diagram of an example local feature extraction network 350.

The local feature extraction subnetwork 350 can be a component of a neural network system that is configured to process an input image and to generate a prediction of a novel image class, from a set of novel image classes, to which the input image belongs. Although the below description refers to implementations in which the neural network system classifies input images into novel image classes, it is to be understood that the techniques described below can be used to train a neural network to classify input images into known image classes. For example, the input image can be obtained from a labeled image set, and the techniques described below can be executed to provide an auxiliary loss in addition to the supervised loss determined from the labels in the labeled image set.

For example, the local feature extraction subnetwork 350 can be the local feature extraction subnetwork 130 of the neural network system 100 described above with reference to FIG. 1, or the novel local feature extraction subnetwork 230 of the neural network 202 described above with reference to FIG. 2.

In particular, the local feature extraction subnetwork 350 is configured to process an embedding 352 of the input image and to generate a predicted image class 372 of the input image. In some implementations, the local feature extraction subnetwork 350 is configured to process the input image itself instead of an embedding 352 of the input image.

The local feature extraction subnetwork 350 includes a local feature projection subnetwork 360 and a local prediction subnetwork 370.

The local feature projection subnetwork 360 is configured to process the image embedding 352 and to generate a local embedding 362 that is an updated embedding of the input image. The local feature projection subnetwork 360 can have any appropriate network architecture. For example, if the image embedding 352 is represented as a one-dimensional tensor, then the local feature projection subnetwork 360 can include one or more feedforward neural network layers. As another example, if the image embedding 352 is represented as a two-dimensional or three-dimensional tensor, then the local feature projection subnetwork 360 can include one or more convolutional neural network layers. As another example, the local feature projection subnetwork 360 can be configured to generate a sequence of elements from the image embedding 352 (e.g., where each element in the sequence includes one or more elements of the tensor representing the image embedding 352), and process the sequence using one or more self-attention neural network layers. In some implementations, the final layer of the local feature projection subnetwork 360 is an average pooling layer.

The operations of the local feature projection subnetwork 360 can be represented as $\psi_p^u$. Thus, given an embedding $w_i^u$ of an unlabeled input image $x_i^u$, the local feature projection subnetwork 360 can compute:

$$z_i^u = \psi_p^u(w_i^u)$$

where $z_i^u$ is the local embedding 312 of the unlabeled input image $x_i^u$.

In some implementations, the local feature projection subnetwork 360 is shared between the local feature extraction subnetwork 350 and a second local feature extraction subnetwork configured to classify images into a set of known image classes (e.g., the known local feature extraction subnetwork 250 described above with reference to FIG. 2). In these implementations, the operations of the local feature projection subnetwork 360 can be represented as $\psi_p$.

The local prediction subnetwork 370 is configured to process the local embedding 362 and to generate the predicted image class 372 for the input image. For example, the local prediction subnetwork 370 can generate an output tensor that identifies, for each novel class in the set of novel classes, a likelihood value that represents a likelihood that the input image belongs to the class. In some such implementations, the local prediction subnetwork 370 can select the novel image class with the highest likelihood value as the predicted image class 372. In some other such implementations, the local prediction subnetwork 370 can sample a novel image class from the set of novel image classes according to the respective likelihood values, and identify the sampled novel image class as the predicted image class 372.

In some implementations, the local prediction subnetwork 370 identifies multiple novel image classes as predicted image classes 372, e.g., by identifying each novel image class whose likelihood value exceeds a predetermined threshold.

In some implementations, e.g., during training of the neural network system, the predicted image class 372 can itself be represented by the output tensor of likelihood values; for example, comparing the predicted image class 372 with the pseudo-labels 392 as described below can include comparing the output tensor of likelihood values with the pseudo-labels 392. During training, the predicted image class 372 can be called the training output of the neural network system.

The operations of the local prediction subnetwork 370 can be represented as $\eta_p^u$.

During training of the neural network system of which the local feature extraction subnetwork 350 is a component, a training engine 394 can process the predicted image class 372 to determine parameter updates to the set of network parameters of the local feature extraction subnetwork 350.

During training of the neural network system, the local feature extraction subnetwork 350 can include a pseudo-label engine 390. Typically, after the neural network system is trained and deployed in an inference environment, the local feature extraction subnetwork 350 does not include the pseudo-label engine 390.

The pseudo-label engine 390 is configured to process the local embedding 362 of the input image and to generate, for the input image, a set of pseudo-labels 392 that each correspond to a respective second input image processed by the neural network system during training. The input image can be called the "first" input image to differentiate from the second input images.

Each pseudo-label 392 corresponding to a particular second input image represents a similarity between (i) local features determined from the local embedding 362 of the first input image (called "first" local features) and (ii) local features determined from the local embedding 362 of the particular second input image (called "second" local features). A local feature of a respective input image can be represented as a tensor of values, and thus can be called a local feature tensor.

For example, the first input image and second input images can be in the same batch of images processed by the neural network system during a particular training step or epoch. Instead or in addition, the second input images can include images processed by the neural network system at respective previous training steps or epochs. In some implementations, the first input image and second input images have been drawn from an unlabeled training set of input images. In some other implementations, the first input image and/or one or more of the second input images have been drawn from a labeled training set of input images, but the labels are not used by the training engine 394 for the techniques described below.

The training engine 394 can determine parameter updates to cause or encourage the local feature extraction subnetwork 350 to generate similar predicted image classes 372 for pairs of input images whose pseudo-labels 392 indicate a high similarity between the local features of the pair of input images. In implementations in which the local feature extraction subnetwork 350 is trained concurrently with a known local feature extraction subnetwork (e.g., in implementations in which the local feature projection subnetwork 360 is shared with the known local feature extraction subnetwork), the local feature projection subnetwork 360 can be trained to generate local embeddings 362 whose local features encode maximal information about the input images relevant for classifying the input images. Thus, if two input images have local embeddings 362 with similar local features, then the two input images are likely to belong to the same novel image class (or have similar predicted image classes 372, e.g., as represented by the output tensor of likelihood values generated by the local prediction subnetwork 370).

The pseudo-label engine 390 can process the local embedding 362 of the first input image to generate the first local features of the first input image. For example, each local feature of an input image can be a particular element or set of elements of the local embedding 362 of the input image (i.e., the pseudo-label engine 390 can determine each local feature tensor corresponding to the input image from the local embedding 362). As a particular example, if the local embedding $z_i^{u'}$ of an input image has size h×w×d (i.e., if $z_i^{u'} \in \mathbb{R}^{h \times w \times d}$), then the pseudo-label engine 390 can generate h w local features from the local embedding $z_i^{u'}$ of the input image, where each local feature is a d-dimensional column of the local embedding $z_i^{u'}$.

In some implementations in which the final neural network layer of the local feature projection subnetwork 360 is a pooling layer, e.g., an average pooling layer, the local feature projection subnetwork 360 provides the local embedding 362 to the pseudo-label engine 390 before the local embedding 362 is processed by the pooling layer. That is, the local feature projection subnetwork 360 provides an initial version of the local embedding 362 to the pseudo-label engine 390, and then updates the initial version of the local embedding 362 by processing the initial version using the pooling layer before providing the updated version of the local embedding 362 to the local prediction subnetwork 370.

In some implementations (e.g., in implementations in which the first input image and second input images are in the same training batch and processed concurrently by the neural network system), the pseudo-label engine 390 obtains the respective local embedding 362 for each second input image from the local feature projection subnetwork 360 and generates the second local features for the second input images as described above. In some other implementations (e.g., in implementations in which the second input images have been processed at respective previous training steps or epochs), the pseudo-label engine 390 obtains the second local features from a memory bank (e.g., the memory bank 380, which is described in more detail below). For example, a memory bank can store the respective local features of each second input image previously processed by the neural network system. As another example, a memory bank can store the respective local features of N second input images, e.g., as a first-in-first-out (FIFO) queue of size N.

Generally, the memory bank 380 is configured to maintain "previous" local features 382 of respective input image previously processed by the neural network system during training. That is, after processing a particular input image, the pseudo-label engine 390 can provide some or all of the local features generated from the local embedding 362 of the particular input image to the memory bank 380 for storage.

Input images whose previous local features 382 are stored by the memory bank 380 are called "previous" input images. The previous local features 382 of the previous input images are used for generating the pseudo-labels 392 for the first input image and respective second input images. As mentioned above, in some implementations, some or all of the previous input images are themselves second input images for which the ranking statistic engine 390 is to generate a pseudo-label 392 for the first input image. In some other implementations, the previous input images whose previous local features 382 are stored by the memory bank 380 are not second input images (e.g., the previous input images can be obtained from a labeled image set).

In some implementations, the memory bank 380 only stores a subset of the local features generated from a particular previous input image. As a particular example, the memory bank 380 can store a single local feature 382 for each previous input image processed during training. As another particular example, the memory bank 380 can store a single local feature 382 for up to N previous input images, e.g., using a FIFO queue of size N.

For each particular second input image, the pseudo-label engine 390 can generate a pseudo-label 392 corresponding to the particular second image by (i) comparing the one or more first local features of the first input image with the set of previous local features 382 (corresponding to respective previous input images) maintained by the memory bank 380 to generate a similarity tensor, and (ii) comparing the similarity tensor of the first input image with a corresponding similarity tensor generated for the particular second input image.

To generate the similarity tensor $o_i^u$ for the first input image $x_i^u$, the pseudo-label engine 390 can generate, for each first local feature of the first input image, a respective similarity value corresponding to each previous local feature 382 of a respective previous input image obtained from the memory bank 380, where the similarity value represents a similarity between the first local feature of the first input image and the previous local feature 382 of the previous input image. The pseudo-label engine 390 can generate the similarity values in any appropriate way, e.g., by determining a product between the first local feature of the first input image and the previous local feature 382 of the second input image. Thus, if the pseudo-label engine 390 obtains e previous local features 382 of respective previous input images from the memory bank 380, then the pseudo-label engine 390 can generate, for each first local feature of the first input image, a set of e similarity values.

For each first local feature of the first input image, the pseudo-label engine 390 can combine the set of similarity values generated for the first local feature corresponding to each previous local feature 382 to generate an initial similarity tensor for the first local feature. For example, the pseudo-label engine 390 can generate an e-dimensional vector whose elements are the e similarity values corresponding to respective previous local features 382 of previous input images.

The pseudo-label engine 390 can then combine the initial similarity tensors corresponding to respective local features of the first input image to generate the similarity tensor $o_i^u$ of the first input image $x_i^u$. For example, the pseudo-label engine 390 can determine an average of the initial similarity tensors. As another example, the pseudo-label engine 390 can process the initial similarity tensors using an average-pooling operation.

Similarly, the pseudo-label engine 390 can execute the techniques described above to generate the similarity tensors $o_j^u$ for the second input images $x_j^u$.

The pseudo-label engine 390 can then generate the pseudo-labels 392 from the respective similarity tensors of the first input image and the second input images. In particular, for each particular second input image, the pseudo-label engine 390 can generate the corresponding pseudo-label 392 by comparing (i) the similarity tensor $o_i^u$ for the first input image $x_i^u$ and (ii) the similarity tensors $o_j^u$ for the particular second input image $x_j^u$.

The pseudo-label engine 390 can generate the pseudo-labels 392 from the similarity tensors of the first input image and second input images using any appropriate comparison technique.

For example, the pseudo-label engine 390 can generate the pseudo-label 392 for each second input image using ranking statistics, i.e., by comparing the top-k elements (i.e., the k elements whose values have the largest magnitude) of the similarity tensor of the first input image and the similarity tensor of the second input image. If the same set of elements or a similar set of elements is in the top-k elements of both similarity tensors, then the local features of the respective input images can be determined to be similar.

As a particular example, the pseudo-label engine 390 can determine the pseudo-label $s_{ij}^p$ between the similarity tensor $o_i^u$ of the first input image $x_i^u$ and the similarity tensor $o_j^u$ of a second input image $x_j^u$ to be:

$$s_{ij}^p = \mathbb{I}\{\text{top}_k(o_i^u) = \text{top}_k(o_j^u)\}$$

where $\mathbb{I}$ is the indicator function and $\text{top}_k(o_i^u)$ identifies the k elements of $o_i^u$ with the largest magnitude.

As another particular example, the pseudo-label engine 390 can determine the pseudo-label $s_{ij}^p$ between the similarity tensor $o_i^u$ of the first input image $x_i^u$ and the similarity tensor $o_j^u$ of a second input image $x_j^u$ to be:

$$s_{ij}^p = \frac{c}{k} \in [0, 1]$$

where c is the number of shared elements in $\text{top}_k(o_i^u)$ and $\text{top}_k(o_j^u)$.

As another example, the pseudo-label engine 390 can generate the pseudo-label 392 corresponding to each second input image by processing the similarity tensor of the first input image and the similarity tensor of the second input image using a similarity metric, e.g., cosine similarity, Euclidean distance, or dot product.

After executing, the neural network system can provide one or more of the first local features of the first input image (and, in implementations in which the second input images are in the same training batch, one or more of the second local features of each second input image) to the memory bank 380 for storage and processing during future executions of the local feature extraction subnetwork 350 (i.e., when the first local features will be considered previous local features 382 of a previous input image). For example, the neural network system can randomly sample a single first local feature and provide the randomly-sampled first local feature to the memory bank 380.

As another example, the neural network system can select the first local feature for which a particular neural network layer of the neural network system generated the highest activation corresponding to the particular class assigned to the first input image (out of all the activations corresponding to the particular class, corresponding to respective first local features, generated by the particular neural network layer). The high activation of the selected first local feature can indicate importance in the classification of the first input image to the particular class (e.g., indicating that the first local feature represents the foreground of the first input image). The neural network system can then provide the selected first local feature to the memory bank 380.

The training engine 394 can compare the respective predicted image class 372 (e.g., as represented by the output tensor of likelihood values across the set of novel image classes) of the first input image and the second input images to generate a parameter update that causes or encourages, for each particular second input image, the respective predicted image classes 372 of the first input image and the particular second input image to be similar if the corresponding pseudo-label 392 indicates a high similarity between the local features of the respective local embeddings 362.

In some implementations (e.g., in implementations in which the first input image and second input images are in the same training batch and processed concurrently by the neural network system), the training engine 394 obtains the respective predicted image classes 372 for each second input image from the global prediction subnetwork 370. In some other implementations, (e.g., in implementations in which the second input images have been processed at respective previous training steps or epochs), the training engine 394 includes a memory bank that stores the respective predicted image class 372 of second input images previously processed by the neural network system.

For example, the training engine 394 can determine a binary cross-entropy loss using the predicted image class 372 of the first input image, the predicted image classes 372 of the second input images, and the pseudo-labels 392. As a particular example, given a set of M unlabeled input images $x_i^u$, the training engine 394 can compute a loss that is equal to or proportional to:

$$\mathcal{L}_{BCE}^p = -\frac{1}{M^2} \sum_{i=1}^{M}\sum_{j=1}^{M} [s_{ij}^p \log\left(\eta_p^u(z_i^{u'})^T \eta_p^u(z_j^{u'})\right) + (1 - s_{ij}^p) \log\left(1 - \eta_p^u(z_i^{u'})^T \eta_p^u(z_j^{u'})\right)]$$

Here, $\eta_p^u(z_i^{u'})^T \eta_p^u(z_j^{u'})$ represents a similarity between the predicted image class 372 of the first input image $x_i^u$ and the predicted image classes 372 of the second input image $x_j^u$. This similarity can also be referred to as $t_{ij}^p$.

The training engine 394 can then determine a parameter update for the network parameters of the local feature extraction subnetwork 350 (and, optionally, other components of the neural network system) using the computed loss value, e.g., based upon stochastic gradient descent or any other appropriate technique for training neural networks. For example, the training engine 394 can backpropagate the computed loss value through the local feature extraction subnetwork 350 and to one or more preceding neural network layers in the neural network system, e.g., to a preceding embedding subnetwork such as the embedding subnetwork 110 described above with reference to FIG. 1.

In some implementations, the pseudo-label engine 390 can determine pseudo-labels 392 by comparing local features of the image embeddings 352 of pairs of input images (instead of by comparing local features of the local embeddings 362 as described above). For example, in some implementations the local feature extraction subnetwork 350 does not include the local feature projection subnetwork 360, and the local prediction subnetwork 370 instead is configured to process the image embedding 352 directly. In these implementations, the training engine 392 can update the network parameters of the local feature extraction subnetwork 350 using the pseudo-labels generated from the local features of the image embeddings 352 as described above.

Figure 4:
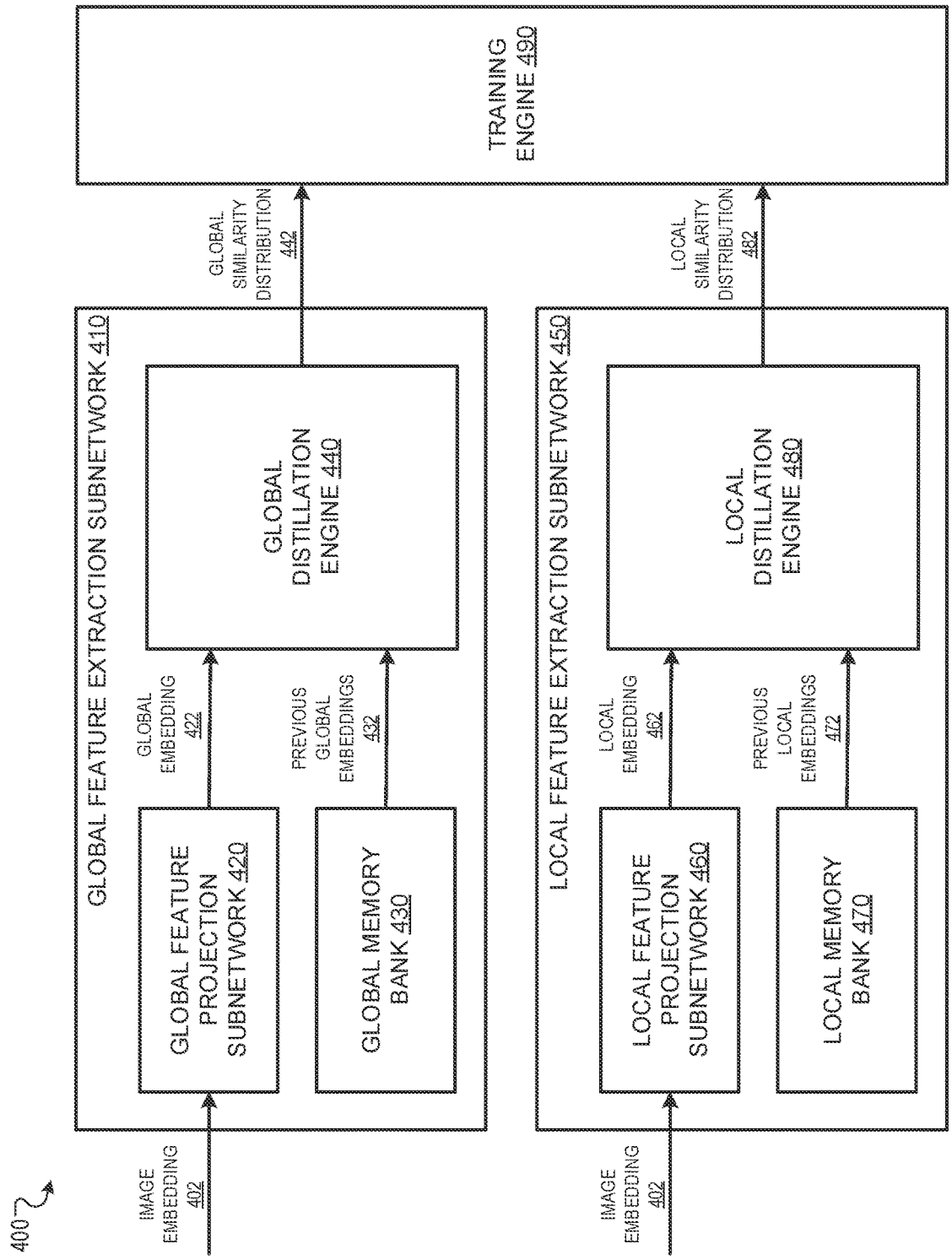
FIG. 4 is a diagram of an example training system configured to train a neural network to perform image classification using mutual knowledge discovery.

FIG. 4 is a diagram of an example training system 400 configured to train a neural network system to perform image classification using mutual knowledge discovery.

The neural network system is configured to process an input image and to generate a prediction of a novel image class, from a set of novel image classes, to which the input image belongs. That is, while the training system 400 executes training of the neural network system, the training system 400 determines the set of novel image classes. Although the below description refers to implementations in which the neural network system classifies input images into novel image classes, it is to be understood that the techniques described below can be used to train a neural network to classify input images into known image classes. For example, the input image can be obtained from a labeled image set, and the techniques described below can be executed to provide an auxiliary loss in addition to the supervised loss determined from the labels in the labeled image set.

The neural network system includes a global feature extraction subnetwork 410 and a local feature extraction subnetwork 450. For example, the global feature extraction subnetwork 410 can be the global feature extraction subnetwork 120 of the neural network system 100 described above with reference to FIG. 1, the novel global feature extraction subnetwork 220 of the neural network 202 described above with reference to FIG. 2, or the global feature extraction subnetwork 300 described above with reference to FIG. 3A. Similarly, the local feature extraction subnetwork 450 can be the local feature extraction subnetwork 130 described above with reference to FIG. 1, the novel local feature extraction subnetwork 230 of the neural network 202 described above with reference to FIG. 2, or the local feature extraction subnetwork 350 described above with reference to FIG. 3B.

In particular, the global feature extraction subnetwork 410 is configured to process an embedding 402 of an input image to determine global features of the input image, and generate a prediction of a class to which the input image belongs from the global features. The global feature extraction subnetwork 410 includes a global feature projection subnetwork 420 that is configured to process the embedding 402 of the input image and to generate a global embedding 422 of the input image that encodes the global features. Although not pictured in FIG. 4, the global feature extraction subnetwork 410 can further include a global prediction subnetwork that is configured to process the global embedding 422 of the input image and to generate the prediction of the novel image class to which the input image belongs.

Similarly, the local feature extraction subnetwork 450 is configured to process the embedding 402 of the input image (i.e., the same embedding 402 of the same input image that is processed by the global feature extraction subnetwork 410) to determine local features of the input image, and generate a prediction of a class to which the input image belongs from the local features. The local feature extraction subnetwork 450 includes a local feature projection subnetwork 460 that is configured to process the embedding 402 of the input image and to generate a local embedding 462 of the input image that encodes the local features. Although not pictured in FIG. 4, the local feature extraction subnetwork 450 can further include a local prediction subnetwork that is configured to process the local embedding 462 of the input image and to generate the prediction of the novel image class to which the input image belongs.

In some implementations, as described above with reference to FIG. 1, after training of the neural network system is completed, the neural network system can be deployed in an inference environment with only one of the global feature extraction subnetwork 410 or the local feature extraction subnetwork 450.

The training system 400 can be configured to train the neural network system using mutual knowledge distillation, i.e., to cause or encourage the global feature extraction subnetwork 410 and the local feature extraction subnetwork 450 to generate the same or similar predictions in response to processing the same image embedding 402. In particular, the training system 400 can generate parameter updates for the global feature extraction subnetwork 410 and the local feature extraction subnetwork 450 to cause or encourage them to generate global embeddings 422 and local embeddings 462, respectively, that are in agreement with each other, as described in more detail below.

During training of the neural network system, the global feature extraction subnetwork 410 can include a global distillation engine 440 and a global memory bank 430. Typically, after the neural network system is trained and deployed in an inference environment, the global feature extraction subnetwork 410 does not include the global distillation engine 440 or the global memory bank 430.

The global distillation engine 440 is configured to process the global embedding 422 of the input image and to generate a global similarity distribution 442 over respective previous global embeddings 432 of previous input images generated by the global feature projection subnetwork 420. The global similarity distribution 442 identifies, for each previous global embedding 432, a similarity between the previous global embedding 432 of the previous input image and the global embedding 422 of the input image. For example, the global similarity distribution 442 can include a respective similarity value for each previous global embedding 432 representing the similarity between the previous global embedding 432 and the global embedding 422.

The global distillation engine 440 can obtain the previous global embeddings 432 from the global memory bank 430. In some implementations, the global memory bank 430 maintains the respective global embedding of each input image processed during training (or, e.g., during a particular training epoch of the training). In some other implementations, the global memory bank 430 maintains only up to T previous embeddings 432, e.g., using a FIFO queue.

Instead of or in addition to obtaining the previous global embeddings 432 from the global memory bank 430, one or more other input images can be in the same training batch as the input image (i.e., can be processed by the neural network system in the same training step or training epoch as the input image), and the global distillation engine 440 can obtain global embeddings of the other input images directly from the global feature projection subnetwork 420. Although the below description generally refers to comparing the global embedding 422 of the input image against "previous" global embeddings of "previous" input images, it is to be understood that the same techniques can be used to compare the global embedding 422 of the input image with global embeddings other input images processed simultaneously with the input image.

In some implementations, the input image and previous input images have been drawn from an unlabeled training set of input images. In some other implementations, the input image and/or one or more of the previous input images have been drawn from a labeled training set of input images, but the labels are not used by the training engine 490 for the techniques described below.

The global distillation engine 440 can generate the similarity values using any appropriate technique. For example, given a previous global embedding 432, the global distillation engine 440 can generate the corresponding similarity value by processing the previous global embedding 432 and the global embedding 422 using a similarity metric, e.g., cosine similarity, Euclidean distance, or dot product. As another example, the global distillation engine 440 can use ranking statistics as described above with reference to FIG. 3A and FIG. 3B.

As another example, given a set of T previous global embeddings $\mathcal{B}_g = [b_1^g, \ldots, b_T^g]$ from the global memory bank 430 and the global embedding $z_i^u = \psi_g^u(w_i^u)$, where $w_i^u$ is the embedding of the input image $x_i^u$ and $\psi_g^u$ represents the operations of the global feature projection subnetwork 420, the global distillation engine 440 can generate the global similarity distribution $p^g$ to be equal to or proportional to:

$$p^g(x_i^u, \mathcal{B}_g) = [p_1^g, \ldots, p_T^g]$$

$$p_j^g = \frac{\exp(z_i^u \cdot b_j^g / \tau)}{\sum_{b_k^g \sim \mathcal{B}_g} \exp(z_i^u \cdot b_k^g / \tau_g)}$$

where $\tau_g$ is a hyperparameter of the training system 400 that represents a scalar "temperature" controlling the sharpness of the similarity distribution, and $p_j^g$ is the similarity value corresponding to the global embedding $b_j^g$.

After executing, the global distillation engine 440 can provide the global embedding 422 to the global memory bank 430 to be used in future executions of the global feature extraction subnetwork 410, i.e., as a previous global embedding 432.

During training of the neural network system, the local feature extraction subnetwork 450 can include a local distillation engine 480 and a local memory bank 470. Typically, after the neural network system is trained and deployed in an inference environment, the local feature extraction subnetwork 450 does not include the local distillation engine 480 or the local memory bank 470.

The local distillation engine 480 is configured to process the local embedding 462 of the input image and to generate a local similarity distribution 482 over respective previous local embeddings 472 of previous input images generated by the local feature projection subnetwork 460. The local similarity distribution 482 identifies, for each previous local embedding 472, a similarity between the previous local embedding 472 of the previous input image and the local embedding 462 of the input image. For example, the local similarity distribution 482 can include a respective similarity value for each previous local embedding 472 representing the similarity between the previous local embedding 472 and the local embedding 462.

The local distillation engine 480 can obtain the previous local embeddings 472 from the local memory bank 470. In some implementations, the local memory bank 470 maintains the respective local embedding of each input image processed during training (or, e.g., during a particular training epoch of the training). In some other implementations, the local memory bank 470 maintains only up to T previous embeddings 472, e.g., using a FIFO queue.

Instead of or in addition to obtaining the previous local embeddings 472 from the local memory bank 470, one or more other input images can be in the same training batch as the input image (i.e., can be processed by the neural network system in the same training step or training epoch as the input image), and the local distillation engine 480 can obtain local embeddings of the other input images directly from the local feature projection subnetwork 460. Although the below description generally refers to comparing the local embedding 462 of the input image against "previous" local embeddings of "previous" input images, it is to be understood that the same techniques can be used to compare the local embedding 462 of the input image with local embeddings other input images processed simultaneously with the input image.

The local memory bank 470 stores previous local embeddings 472 for the same previous input images as the global memory bank 430. That is, for each previous global embedding 432 generated by the global feature projection subnetwork 420 in response to processing a particular previous input image and stored by the global memory bank 430, the local memory bank 470 stores a previous local embedding 472 generated by the local feature projection subnetwork 460 in response to processing the same particular previous input image.

The local distillation engine 480 can generate the similarity values using any appropriate technique. For example, given a previous local embedding 472, the local distillation engine 480 can generate the corresponding similarity value by processing the previous local embedding 472 and the local embedding 462 using a similarity metric, e.g., cosine similarity, Euclidean distance, or dot product. As another example, the local distillation engine 480 can use ranking statistics as described above with reference to FIG. 3A and FIG. 3B.

As another example, given a set of T previous local embeddings $\mathcal{B}_p = [b_1^p, \ldots, b_T^p]$ from the local memory bank 470 and the local embedding $z_i^{u\prime} = \psi_p^u(w_i^u)$, where $w_i^u$ is the embedding of the input image $x_i^u$ and $\psi_p^u$ represents the operations of the local feature projection subnetwork 460, the local distillation engine 480 can generate the local similarity distribution $p^p$ to be equal to or proportional to:

$$p^p(x_i^u, \mathcal{B}_p) = [p_1^p, \ldots, p_T^p]$$

$$p_j^p = \frac{\exp(z_i^{u\prime} \cdot b_j^p / \tau)}{\sum_{b_k^p \sim \mathcal{B}_p} \exp(z_i^{u\prime} \cdot b_k^p / \tau_p)}$$

where $\tau_p$ is a hyperparameter of the training system 400 that represents a scalar "temperature" controlling the sharpness of the similarity distribution, and $p_j^p$ is the similarity value corresponding to the local embedding $b_j^p$. In some implementations, $\tau_p = \tau_g$. Because each local embedding $b_j^p$ stored by the local memory bank 470 corresponds to a local embedding $b_j^g$ stored by the global memory bank 430, each similarity value $p_j^p$ in the local similarity distribution 482 corresponds to a similarity value $p_j^g$ in the global similarity distribution 442.

After executing, the local distillation engine 480 can provide the local embedding 462 to the local memory bank 470 to be used in future executions of the local feature extraction subnetwork 450, i.e., as a previous local embedding 472.

The training engine 490 can generate a parameter update for the global feature extraction subnetwork 410 and the local feature extraction subnetwork 450 that causes or encourages the global similarity distribution 442 and the local similarity distribution to be more similar.

Because the previous global embeddings 432 stored by the global memory bank 430 and the previous local embeddings 472 stored by the local memory bank 470 were generated using the same set of previous input images, it is to be expected that, after training of the neural network system, the global embedding 422 generated by the global feature projection subnetwork 420 will have the same relationship (represented by the global similarity distribution 442) with the previous global embeddings 432 as the relationship (represented by the local similarity distribution 482) between the local embedding 462 generated by the local feature projection subnetwork 460 and the previous local embeddings 472. In other words, training should cause the global embedding 422 and previous global embeddings 432 generated by the global feature projection subnetwork 420 to be "in agreement" with the local embedding 462 and previous local embeddings 472 generated by the local feature projection subnetwork 460, where the extent of agreement can be approximated according to the extent to which the global similarity distribution 442 and the local similarity distribution 482 are similar to each other.

In particular, the training engine 490 can determine a loss value that is proportional to a dissimilarity between the global similarity distribution 442 and the local similarity distribution 482.

For example, given the global similarity distribution $p^g$ and the local similarity distribution $p^p$, the training engine 490 can determine the KL divergence:

$$\mathcal{L}_{KL}^p = D_{KL}(p^p \| p^g) = p^p \log \frac{p^p}{p^g}$$

$$\mathcal{L}_{KL}^g = D_{KL}(p^g \| p^p) = p^g \log \frac{p^g}{p^p}$$

or the symmetric KL divergence:

$$\mathcal{L}_{SKL} = \tfrac{1}{2}(D_{KL}(p^p \| p^g) + D_{KL}(p^g \| p^p))$$

As another example, the training engine can determine the Jensen-Shannon divergence:

$$\mathcal{L}_{JSD} = \text{JSD}(p^p \| p^g) = \tfrac{1}{2}(D_{KL}(p^p \| p') + D_{KL}(p^g \| p'))$$

$$p' = \tfrac{1}{2}(p^p + p^g)$$

The training engine 490 can then determine a parameter update for the network parameters of the local feature extraction subnetwork 450 and the global feature extraction subnetwork 410 (and, optionally, other components of the neural network system) using the computed loss value, e.g., based upon stochastic gradient descent or any other appropriate technique for training neural networks. For example, the training engine 490 can backpropagate the computed loss value through the feature extraction subnetworks 410 and 450 and to one or more preceding neural network layers in the neural network system, e.g., to a preceding embedding subnetwork such as the embedding subnetwork 110 described above with reference to FIG. 1.

In some implementations, the global feature extraction subnetwork 410 and/or the local feature extraction subnetwork 450 can be configured to process the input image directly, instead of an embedding 402 of the input image. That is, one or more of the subnetworks 410 or 420 can process a subnetwork input that includes the input image itself instead of or in addition to the image embedding 402.

In some implementations, the global distillation engine 440 can generate the global similarity distribution 442 by comparing (i) the predicted image class of the input image generated by the global prediction subnetwork and (ii) respective previous predicted image classes of previous input images (instead of by comparing the global embedding 422 and previous global embeddings 432 as described above). Similarly, the local distillation engine 480 can generate the local similarity distribution 482 by comparing (i) the predicted image class of the input image generated by the local prediction subnetwork and (ii) respective previous predicted image classes of previous input images (instead of by comparing the local embedding 462 and previous local embeddings 472 as described above). In these implementations, the training engine 490 can update the network parameters of the global feature extraction subnetwork 410 and the local feature extraction subnetwork 450 using the similarity distributions 442 and 482 generated from the predicted image classes as described above.

Figure 5:
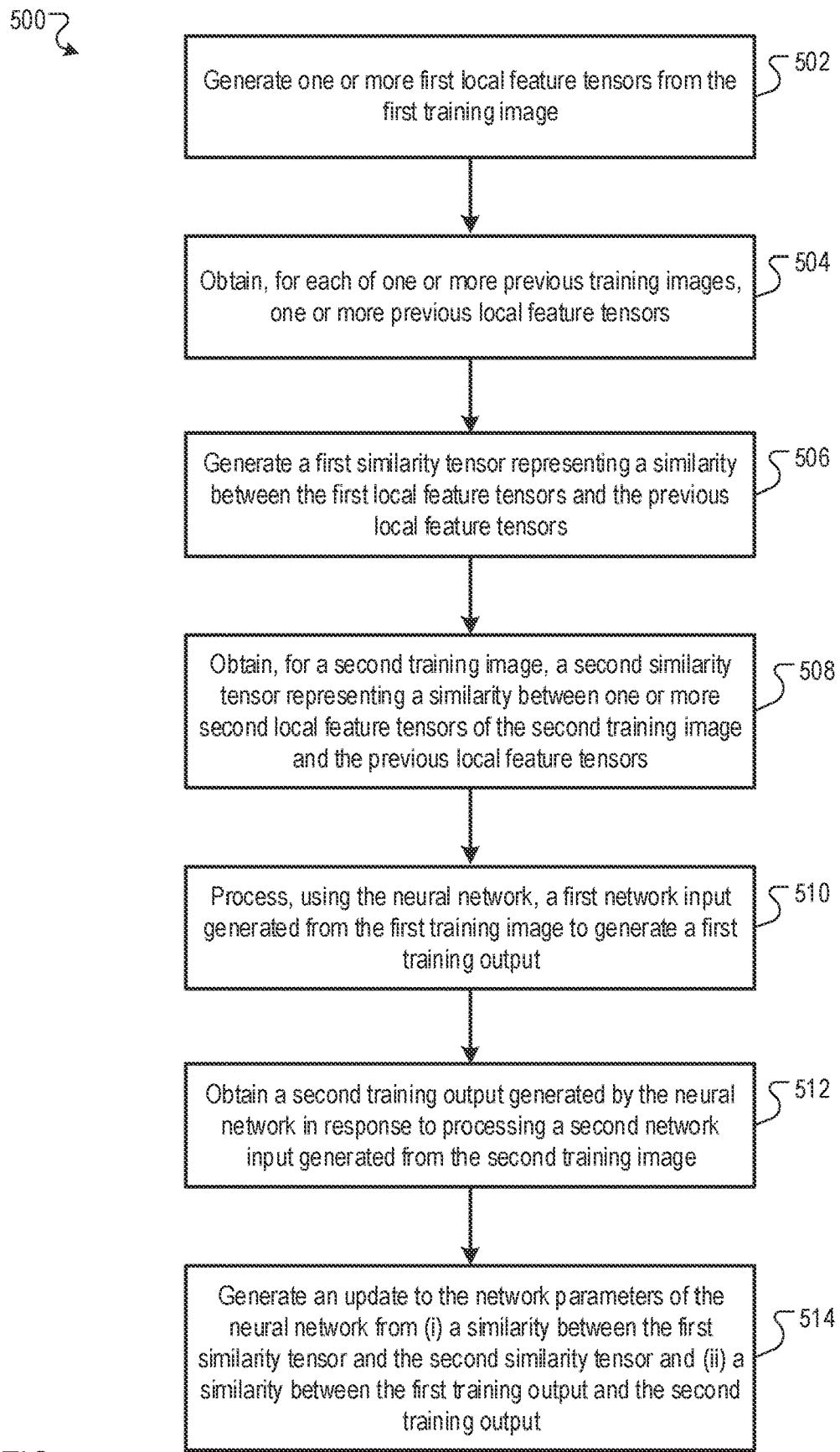
FIG. 5 is a flow diagram of an example process for training a neural network using local feature tensors.

FIG. 5 is a flow diagram of an example process 500 for training a neural network using local feature tensors. For convenience, the process 500 will be described as being performed by a system of one or more computers located in one or more locations. For example, a training engine, e.g., the training engine 394 described above with reference to FIG. 3B, appropriately programmed in accordance with this specification, can perform the process 500.

The neural network includes a set of network parameters, and is configured to process a network input representing an input image and to generate a network output representing a predicted class, from a set of classes, to which the input image belongs.

The system can perform the process 500 multiple times using respective first training images, e.g., first training images from a set of unlabeled training images.

The system generates one or more first local feature tensors from the first training image, where each first local feature tensor corresponds to a particular spatial region of the first training image (step 502).

The system obtains, for each of one or more previous training images previously processed by the neural network, one or more previous local feature tensors generated from the previous training image, where each previous local feature tensor corresponds to a particular spatial region of the respective previous training image (step 504).

The system generates a first similarity tensor representing a similarity between the first local feature tensors of the first training image and the previous local feature tensors of the previous training images (step 506).

The system obtains, for a second training image, a second similarity tensor representing a similarity between (i) one or more second local feature tensors generated from the second training image and (ii) the previous local feature tensors of the previous training images (step 508).

The system processes, using the neural network, a first network input determined from the first training image to generate a first training output representing a class prediction for the first training image (step 510). In some implementations, the first network input is the first training image itself. In some other implementations, the system (or an external system) processes the first training image (e.g., using one or more neural network layers) to generate the first network input.

The system obtains a second training output representing a class prediction for the second training image, where the second training output has been generated by the neural network in response to processing a second network input determined from the second training image (step 512).

The system generates an update to the network parameters of the neural network from (i) a similarity between the first similarity tensor and the second similarity tensor and (ii) a similarity between the first training output and the second training output (step 514).

Figure 6:
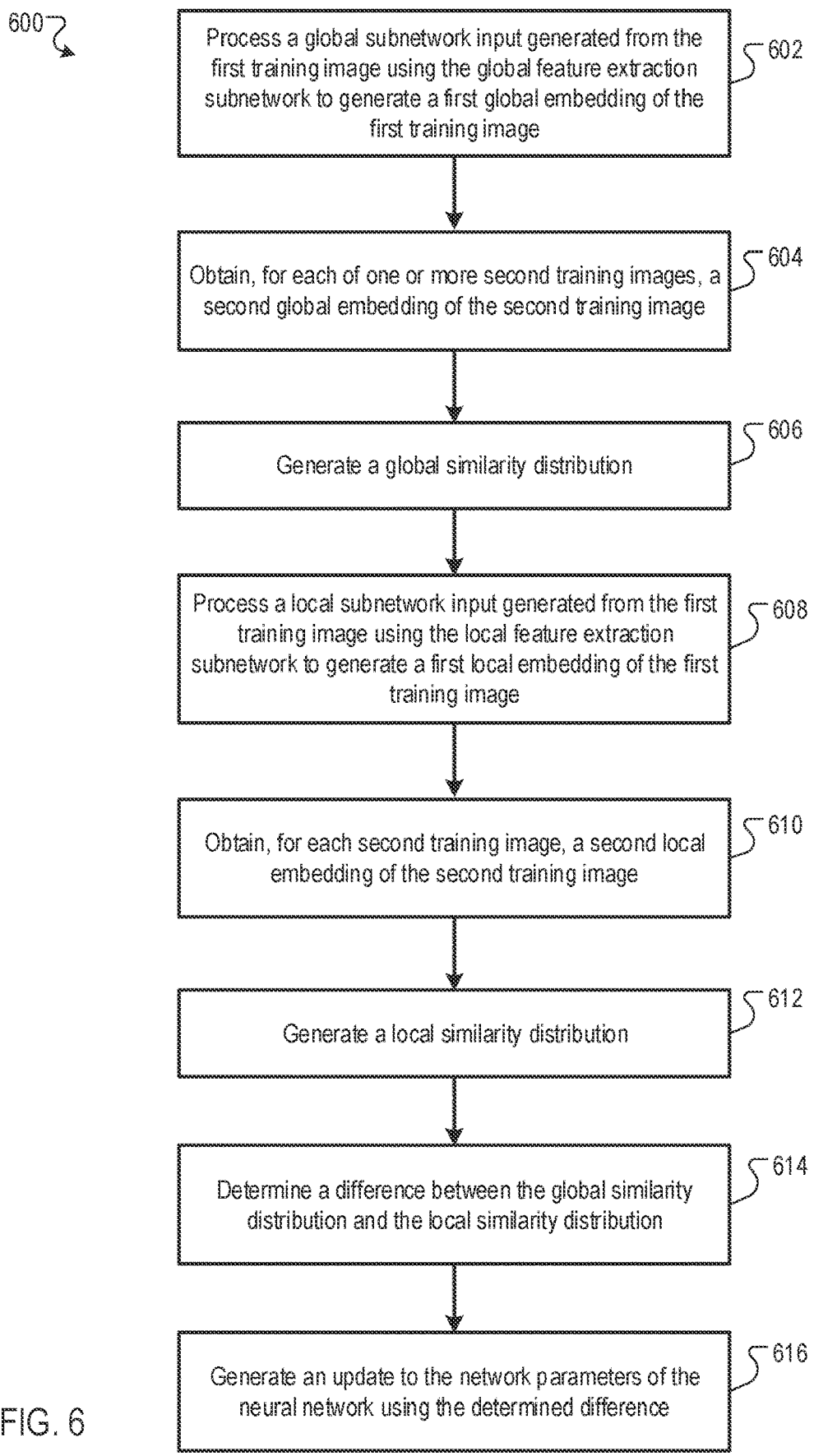
FIG. 6 is a flow diagram of an example process for training a neural network using mutual knowledge distillation.

FIG. 6 is a flow diagram of an example process 600 for training a neural network using mutual knowledge distillation. For convenience, the process 600 will be described as being performed by a system of one or more computers located in one or more locations. For example, a training system, e.g., the training system 400 described above with reference to FIG. 4, appropriately programmed in accordance with this specification, can perform the process 600.

The neural network includes a set of network parameters, and is configured to process a network input representing an input image and to generate a network output representing a predicted class, from a set of classes, to which the input image belongs.

The neural network includes (i) a global feature extraction subnetwork configured to extract global features from the input image and (ii) a local feature extraction subnetwork configured to extract local features from the input image.

The system can perform the process 600 multiple times using respective first training images, e.g., first training images from a set of unlabeled training images.

The system processes a global subnetwork input determined from the first training image using the global feature extraction subnetwork to generate a first global embedding of the first training image that encodes global features of the first training image (step 602). In some implementations, the global subnetwork input is the first training image itself. In some other implementations, the system (or an external system) processes the first training image (e.g., using one or more neural network layers) to generate the global subnetwork input.

The system obtains, for each of one or more second training images, a second global embedding of the second training image that encodes global features of the second training image (step 604).

The system generates a global similarity distribution that identifies, for each second training image, a similarity between the first global embedding of the first training image and the second global embedding of the second training image (step 606).

The system processes a local subnetwork input determined from the first training image using the local feature extraction subnetwork to generate a first local embedding of the first training image that encodes local features of the first training image (step 608). In some implementations, the local subnetwork input is the first training image itself. In some other implementations, the system (or an external system) processes the first training image (e.g., using one or more neural network layers) to generate the local subnetwork input.

The system obtains, for each second training image, a second local embedding of the second training image that encodes local features of the second training image (step 610).

The system generates a local similarity distribution that identifies, for each second training image, a similarity between the first local embedding of the first training image and the second local embedding of the second training image (step 612).

The system determines a difference between the global similarity distribution and the local similarity distribution (step 614).

The system generates an update to the network parameters of the neural network using the determined difference (step 616).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method of training a neural network having a plurality of network parameters to process a network input representing an input image and to generate a network output representing a predicted class, from a set of classes, to which the input image belongs, the method comprising:
generating one or more first local feature tensors from a first training image from a training image set, wherein each first local feature tensor corresponds to a particular spatial region of the first training image;

obtaining, for each of one or more previous training images previously processed by the neural network, one or more previous local feature tensors generated from the previous training image, wherein each previous local feature tensor corresponds to a particular spatial region of the respective previous training image;

generating a first similarity tensor representing a similarity between the first local feature tensors of the first training image and the previous local feature tensors of the previous training images;

obtaining, for a second training image from the training image set, a second similarity tensor representing a similarity between (i) one or more second local feature tensors generated from the second training image and (ii) the previous local feature tensors of the previous training images;

processing, using the neural network, a first network input determined from the first training image to generate a first training output representing a class prediction for the first training image;

obtaining a second training output representing a class prediction for the second training image, the second training output having been generated by the neural network in response to processing a second network input determined from the second training image; and generating an update to the network parameters of the neural network from (i) a similarity between the first similarity tensor and the second similarity tensor and (ii) a similarity between the first training output and the second training output.

Embodiment 2 is the method of embodiment 1, wherein a composition of each class in the set of classes is learned during the training.

Embodiment 3 is the method of embodiment 2, wherein the neural network is trained concurrently with a second neural network configured to classify input images into a set of known image classes that is predetermined before the training.

Embodiment 4 is the method of embodiment 3, wherein the one or more previous training images are obtained from a second training image set used to train the second neural network, wherein the second training image set is different from the training image set.

Embodiment 5 is the method of any one of embodiments 1-3, wherein the one or more previous training images are obtained from the same training image set as the first training image and the second training image.

Embodiment 6 is the method of any one of embodiments 1-5, wherein the update to the network parameters of the neural network causes the similarity between the first similarity tensor and the second similarity tensor to be proportional to the similarity between the first training output and the second training output.

Embodiment 7 is the method of any one of embodiments 1-6, wherein generating a first similarity tensor representing a similarity between the first local feature tensors of the first training image and the previous local feature tensors of the previous training images comprises:

for each first local feature tensor of the first training image:

generating a respective similarity value corresponding to each previous local feature, the similarity value representing a similarity between the first local feature tensor and previous local feature tensor, and generating an initial similarity tensor from the similarity values; and combining the respective initial similarity tensors corresponding to the first local feature tensors to generate the first similarity tensor for the first training image.

Embodiment 8 is the method of any one of embodiments 1-7, wherein:

the previous local feature tensors generated from the previous training images are stored in a memory bank; and the method further comprises:

randomly sample one of the first local feature tensors and storing the sampled first local feature tensor in the memory, or identifying the first local feature tensor with a highest activation, from a set of activations corresponding to respective first local feature tensors, and storing the identified first local feature tensor in the memory bank, the set of activations having been generated by a particular neural network layer of the neural network and corresponding to the class prediction for the first training image.

Embodiment 9 is the method of any one of embodiments 1-8, wherein generating one or more first local feature tensors from the first training image comprises:

processing the first network input determined from the first training image using a first subnetwork of the neural network to generate an embedding of the first training image, the embedding comprising a plurality of elements; and generating the first local feature tensors from the embedding of the first training image, wherein each first local feature tensor comprises a respective different strict subset of the elements of the embedding.

Embodiment 10 is the method of any one of embodiments 1-9, wherein:

the first similarity tensor comprises a plurality of first elements each having a respective value;

the second similarity tensor comprises a plurality of second elements each having a respective value; and the similarity between the first similarity tensor and the second similarity tensor is determine by performing operations comprising:

identifying the top-k first elements of the first similarity tensor, identifying the top-k second elements of the second similarity tensor, and determining a similarity between the top-k first elements and the top-k second elements.

Embodiment 11 is the method of embodiment 10, wherein determining the similarity between the top-k first elements and the top-k second elements comprises computing:

$$s_{ij}^p = \frac{c}{k} \in [0, 1]$$

where c is a number of shared elements between the top-k first elements and the top-k second elements.

Embodiment 12 is the method of any one of embodiments 10 or 11, wherein generating the update to the network parameters of the neural network comprises computing:

$$s_{ij}^p \log(t_{ij}^p) + (1 - s_{ij}^p)\log(1 - t_{ij}^p)$$

wherein $s_{ij}^p$ represents the similarity between the first similarity tensor and the second similarity tensor and $t_{ij}^p$ represents the similarity between the first training output and the second training output.

Embodiment 13 is the method of any one of embodiments 1-12, wherein:

during training of the neural network, the neural network comprises:
- a global feature extraction subnetwork configured to extract global features from the first training image, wherein the global features relate to the entire first training image; and
- a local feature extraction subnetwork configured to extract local features from the first training image, comprising generating the first local feature tensors.

Embodiment 14 is the method of embodiment 13, wherein, after the training is complete, one or more of the global feature extraction subnetwork or local feature extraction subnetwork is removed from the neural network before deploying the neural network in an inference environment.

Embodiment 15 is a method of training a neural network having a plurality of network parameters to process a network input representing an input image and to generate a network output representing a predicted class, from a set of classes, to which the image belongs, the neural network comprising (i) a global feature extraction subnetwork configured to extract global features from the input image and (ii) a local feature extraction subnetwork configured to extract local features from the input image, the method comprising:
  processing a global subnetwork input determined from a first training image using the global feature extraction subnetwork to generate a first global embedding of the first training image that encodes global features of the first training image;
  obtaining, for each of one or more second training images, a second global embedding of the second training image that encodes global features of the second training image;
  generating a global similarity distribution that identifies, for each second training image, a similarity between the first global embedding of the first training image and the second global embedding of the second training image;
  processing a local subnetwork input determined from the first training image using the local feature extraction subnetwork to generate a first local embedding of the first training image that encodes local features of the first training image;
  obtaining, for each second training image, a second local embedding of the second training image that encodes local features of the second training image;
  generating a local similarity distribution that identifies, for each second training image, a similarity between the first local embedding of the first training image and the second local embedding of the second training image;
  determining a difference between the global similarity distribution and the local similarity distribution; and
  generating an update to the network parameters of the neural network using the determined difference.

Embodiment 16 is the method of embodiment 15, wherein a composition of each class in the set of classes is learned during the training.

Embodiment 17 is the method of embodiment 16, wherein the neural network is trained concurrently with a second neural network configured to classify input images into a set of known image classes that is predetermined before the training.

Embodiment 18 is the method of any one of embodiments 15-17, wherein generating the global similarity distribution comprises:
  generating, for each second training image, a similarity value representing the similarity between the first global embedding of the first training image and the second global embedding of the second training image; and
  determining the global similarity distribution from the similarity values.

Embodiment 19 is the method of embodiment 18, wherein generating the similarity values for the second training images and determining the global similarity distribution from the similarity values comprises computing:

$$p_j^g = \frac{\exp(z_i^u \cdot b_j^g / \tau)}{\Sigma_{b_k^g \sim \mathcal{B}_g} \exp(z_i^u \cdot b_k^g / \tau_g)}$$

$$p^g(x_i^u, \mathcal{B}_g) = [p_1^g, \ldots, p_T^g]$$

wherein $\mathcal{B}_g = [b_1^g, \ldots, b_T^g]$ represents the second global embeddings $b_j^g$ of the second training images, $z_i^u$ is the first global embedding of the first training image $x_i^u$, $p_j^g$ is the similarity value corresponding to the second global embedding $b_j^g$, $p^g$ is the global similarity distribution, T is a number of second training images, and $\tau_g$ is a hyperparameter representing a scalar temperature of the global similarity distribution.

Embodiment 20 is the method of any one of embodiments 15-19, wherein generating the local similarity distribution comprises:
  generating, for each second training image, a similarity value representing the similarity between the first local embedding of the first training image and the second local embedding of the second training image; and
  determining the local similarity distribution from the similarity values.

Embodiment 21 is the method of embodiment 20, wherein generating the similarity values for the second training images and determining the local similarity distribution from the similarity values comprises computing:

$$p_j^p = \frac{\exp(z_i^{u\prime} \cdot b_j^p / \tau)}{\Sigma_{b_k^p \sim \mathcal{B}_p} \exp(z_i^{u\prime} \cdot b_k^p / \tau_g)}$$

$$p^p(x_i^u, \mathcal{B}_p) = [p_1^p, \ldots, p_T^p]$$

wherein $\mathcal{B}_p = [b_1^p, \ldots, b_T^p]$ represents the second local embeddings $b_j^p$ of the second training images, $z_i^{u\prime}$ is the first local embedding of the first training image $x_i^u$, $p_j^p$ is the similarity value corresponding to the second local embedding $b_j^p$, $p^p$ is the local similarity distribution, T is a number of second training images, and $\tau_p$ is a hyperparameter representing a scalar temperature of the global similarity distribution.

Embodiment 22 is the method of any one of embodiments 15-21, wherein determining the difference between the global similarity distribution and the local similarity distribution comprises computing:

$$\tfrac{1}{2}(D_{KL}(p^p \| p^g) + D_{KL}(p^g \| p^p))$$

wherein $D_{KL}$ represents a Kullback-Leibler divergence operation, $p^g$ is the global similarity distribution, and $p^p$ is the local similarity distribution.

Embodiment 23 is the method of any one of embodiments 15-21, wherein determining the difference between the global similarity distribution and the local similarity distribution comprises computing:

$$\tfrac{1}{2}(D_{KL}(p^p\|p')+D_{KL}(p^g\|p'))$$

$$p'=\tfrac{1}{2}(p^p+p^g)$$

wherein $D_{KL}$ represents a Kullback-Leibler divergence operation, $p^g$ is the global similarity distribution, and $p^p$ is the local similarity distribution.

Embodiment 24 is the method of any one of embodiments 15-23, wherein, after the training is complete, one or more of the global feature extraction subnetwork or local feature extraction subnetwork is removed from the neural network before deploying the neural network in an inference environment.

Embodiment 25 is a system comprising one or more computers and one or more storage devices storing instructions that when executed by the one or more computers cause the one or more computers to perform the operations of the method of any one of embodiments 1-24.

Embodiment 26 is one or more non-transitory computer storage media storing instructions that when executed by one or more computers cause the one or more computers to perform the operations of the method of any one of embodiments 1-24.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network having a plurality of network parameters to process a network input representing an input image and to generate a network output representing a predicted class, from a set of classes, to which the input image belongs, the method comprising:
   in a local feature extraction subnetwork:
      generating one or more first local feature tensors from a first training image from a training image set, wherein each first local feature tensor corresponds to a particular spatial region of the first training image;
      obtaining, for each of one or more previous training images previously processed by the neural network, one or more previous local feature tensors generated from the previous training image, wherein each previous local feature tensor corresponds to a particular spatial region of the respective previous training image;
      generating a first similarity tensor representing a similarity between the first local feature tensors of the first training image and the previous local feature tensors of the previous training images;
      obtaining, for a second training image from the training image set, a second similarity tensor representing a similarity between (i) one or more second local feature tensors generated from the second training image and (ii) the previous local feature tensors of the previous training images;
   processing, using the neural network, a first network input determined from the first training image to generate a first training output representing a class prediction for the first training image;
   obtaining a second training output representing a class prediction for the second training image, the second training output having been generated by the neural network in response to processing a second network input determined from the second training image; and
   generating an update to the network parameters of the neural network from (i) a similarity between the first similarity tensor and the second similarity tensor and (ii) a similarity between the first training output and the second training output;
   wherein a neural network trained on the local features generates a network output representing a predicted class, and the network output has a first precision that is greater than a second precision of a network output of a neural network trained only on global features.

2. The method of claim 1, wherein a composition of each class in the set of classes is learned during the training.

3. The method of claim 2, wherein the neural network is trained concurrently with a second neural network configured to classify input images into a set of known image classes that is predetermined before the training.

4. The method of claim 3, wherein the one or more previous training images are obtained from a second training image set used to train the second neural network, wherein the second training image set is different from the training image set.

5. The method of claim 1, wherein the one or more previous training images are obtained from the same training image set as the first training image and the second training image.

6. The method of claim 1, wherein the update to the network parameters of the neural network causes the similarity between the first similarity tensor and the second similarity tensor to be proportional to the similarity between the first training output and the second training output.

7. The method of claim 1, wherein generating a first similarity tensor representing a similarity between the first local feature tensors of the first training image and the previous local feature tensors of the previous training images comprises:
- for each first local feature tensor of the first training image:
  - generating a respective similarity value corresponding to each previous local feature, the similarity value representing a similarity between the first local feature tensor and previous local feature tensor, and
  - generating an initial similarity tensor from the similarity values; and
- combining the respective initial similarity tensors corresponding to the first local feature tensors to generate the first similarity tensor for the first training image.

8. The method of claim 1, wherein:
- the previous local feature tensors generated from the previous training images are stored in a memory bank; and
- the method further comprises:
  - randomly sample one of the first local feature tensors and storing the sampled first local feature tensor in the memory, or
  - identifying the first local feature tensor with a highest activation, from a set of activations corresponding to respective first local feature tensors, and storing the identified first local feature tensor in the memory bank, the set of activations having been generated by a particular neural network layer of the neural network and corresponding to the class prediction for the first training image.

9. The method of claim 1, wherein generating one or more first local feature tensors from the first training image comprises:
- processing the first network input determined from the first training image using a first subnetwork of the neural network to generate an embedding of the first training image, the embedding comprising a plurality of elements; and
- generating the first local feature tensors from the embedding of the first training image, wherein each first local feature tensor comprises a respective different strict subset of the elements of the embedding.

10. The method of claim 1, wherein:
- the first similarity tensor comprises a plurality of first elements each having a respective value;
- the second similarity tensor comprises a plurality of second elements each having a respective value; and
- the similarity between the first similarity tensor and the second similarity tensor is determine by performing operations comprising:
  - identifying the top-k first elements of the first similarity tensor,
  - identifying the top-k second elements of the second similarity tensor, and
  - determining a similarity between the top-k first elements and the top-k second elements.

11. The method of claim 10, wherein determining the similarity between the top-k first elements and the top-k second elements comprises computing:

$$s_{ij}^p = \frac{c}{k} \in [0, 1]$$

where c is a number of shared elements between the top-k first elements and the top-k second elements, and $s_{ij}^p$ represents the similarity between the first similarity tensor and the second similarity tensor.

12. The method of claim 10, wherein generating the update to the network parameters of the neural network comprises computing:

$$s_{ij}^p \log(t_{ij}^p) + (1 - s_{ij}^p)\log(1 - t_{ij}^p)$$

wherein $s_{ij}^p$ represents the similarity between the first similarity tensor and the second similarity tensor and $t_{ij}^p$ represents the similarity between the first training output and the second training output.

13. The method of claim 1, wherein:
- during training of the neural network, the neural network further comprises a global feature extraction subnetwork configured to extract global features from the first training image, wherein the global features relate to the entire first training image; and
- wherein:
  - the local feature extraction subnetwork is configured to:
    - extract local features from the first training image, comprising generating the first local feature tensors;
    - generate a local similarity distribution that identifies, for the second training image, a similarity between first local embeddings of the first training image and second local embeddings of the second training image;
  - the global feature extraction subnetwork is configured to:
    - extract global features from training images, wherein the global features relate to an entire training image;
    - generate a global similarity distribution that identifies, for the second training image, a similarity between first global embeddings of the first training image and second global embeddings of the second training image;
  - wherein:
    - generating an update to the network parameters of the neural network further comprises generating the update to the network parameters of the neural network based on a difference between the global similarity distribution and the local similarity distribution; and
    - after the training is complete, the local feature extraction subnetwork is removed from the neural network before deploying the neural network in an inference environment.

14. A system comprising one or more computers and one or more storage devices storing instructions that when executed by the one or more computers cause the one or more computers to perform operations for training a neural network having a plurality of network parameters to process a network input representing an input image and to generate a network output representing a predicted class, from a set of classes, to which the input image belongs, the operations comprising:
- in a local feature extraction subnetwork:
  - generating one or more first local feature tensors from a first training image from a training image set, wherein each first local feature tensor corresponds to a particular spatial region of the first training image;

obtaining, for each of one or more previous training images previously processed by the neural network, one or more previous local feature tensors generated from the previous training image, wherein each previous local feature tensor corresponds to a particular spatial region of the respective previous training image;

generating a first similarity tensor representing a similarity between the first local feature tensors of the first training image and the previous local feature tensors of the previous training images;

obtaining, for a second training image from the training image set, a second similarity tensor representing a similarity between (i) one or more second local feature tensors generated from the second training image and (ii) the previous local feature tensors of the previous training images;

processing, using the neural network, a first network input determined from the first training image to generate a first training output representing a class prediction for the first training image;

obtaining a second training output representing a class prediction for the second training image, the second training output having been generated by the neural network in response to processing a second network input determined from the second training image; and generating an update to the network parameters of the neural network from (i) a similarity between the first similarity tensor and the second similarity tensor and (ii) a similarity between the first training output and the second training output;

wherein a neural network trained on the local features generates a network output representing a predicted class, and the network output has a first precision that is greater than a second precision of a network output of a neural network trained only on global features.

15. The system of claim 14, wherein a composition of each class in the set of classes is learned during the training.

16. The system of claim 14, wherein the update to the network parameters of the neural network causes the similarity between the first similarity tensor and the second similarity tensor to be proportional to the similarity between the first training output and the second training output.

17. The system of claim 14, wherein:
during training of the neural network, the neural network further comprises a global feature extraction subnetwork configured to extract global features from the first training image, wherein the global features relate to the entire first training image; and
wherein:
the local feature extraction subnetwork is configured to:
extract local features from the first training image, comprising generating the first local feature tensors;
generate a local similarity distribution that identifies, for the second training image, a similarity between first local embeddings of the first training image and second local embeddings of the second training image;
the global feature extraction subnetwork is configured to:
extract global features from training images, wherein the global features relate to an entire training image;
generate a global similarity distribution that identifies, for the second training image, a similarity between first global embeddings of the first training image and second global embeddings of the second training image;
wherein:
generating an update to the network parameters of the neural network further comprises generating the update to the network parameters of the neural network based on a difference between the global similarity distribution and the local similarity distribution; and
after the training is complete, the local feature extraction subnetwork is removed from the neural network before deploying the neural network in an inference environment.

18. One or more non-transitory computer storage media storing instructions that when executed by one or more computers cause the one or more computers to perform operations for training a neural network having a plurality of network parameters to process a network input representing an input image and to generate a network output representing a predicted class, from a set of classes, to which the input image belongs, the operations comprising:
in a local feature extraction subnetwork:
generating one or more first local feature tensors from a first training image from a training image set, wherein each first local feature tensor corresponds to a particular spatial region of the first training image;
obtaining, for each of one or more previous training images previously processed by the neural network, one or more previous local feature tensors generated from the previous training image, wherein each previous local feature tensor corresponds to a particular spatial region of the respective previous training image;
generating a first similarity tensor representing a similarity between the first local feature tensors of the first training image and the previous local feature tensors of the previous training images;
obtaining, for a second training image from the training image set, a second similarity tensor representing a similarity between (i) one or more second local feature tensors generated from the second training image and (ii) the previous local feature tensors of the previous training images;
processing, using the neural network, a first network input determined from the first training image to generate a first training output representing a class prediction for the first training image;
obtaining a second training output representing a class prediction for the second training image, the second training output having been generated by the neural network in response to processing a second network input determined from the second training image; and
generating an update to the network parameters of the neural network from (i) a similarity between the first similarity tensor and the second similarity tensor and (ii) a similarity between the first training output and the second training output;
wherein a neural network trained on the local features generates a network output representing a predicted class, and the network output has a first precision that is greater than a second precision of a network output of a neural network trained only on global features.

19. The one or more non-transitory computer storage media of claim 18, wherein a composition of each class in the set of classes is learned during the training.

20. The one or more non-transitory computer storage media of claim 18, wherein the update to the network parameters of the neural network causes the similarity between the first similarity tensor and the second similarity tensor to be proportional to the similarity between the first training output and the second training output.

21. The one or more non-transitory computer storage media of claim 18, wherein:
during training of the neural network, the neural network further comprises a global feature extraction subnetwork configured to extract global features from the first training image, wherein the global features relate to the entire first training image; and
wherein:
the local feature extraction subnetwork is configured to:
extract local features from the first training image, comprising generating the first local feature tensors;
generate a local similarity distribution that identifies, for the second training image, a similarity between first local embeddings of the first training image and second local embeddings of the second training image;
the global feature extraction subnetwork is configured to:
extract global features from training images, wherein the global features relate to an entire training image;
generate a global similarity distribution that identifies, for the second training image, a similarity between first global embeddings of the first training image and second global embeddings of the second training image;
wherein:
generating an update to the network parameters of the neural network further comprises generating the update to the network parameters of the neural network based on a difference between the global similarity distribution and the local similarity distribution; and
after the training is complete, the local feature extraction subnetwork is removed from the neural network before deploying the neural network in an inference environment.

* * * * *